United States Patent [19]

Hempy et al.

[11] 4,428,064

[45] Jan. 24, 1984

[54] CONTROLLING BUFFERED PERIPHERAL SUBSYSTEMS

[75] Inventors: Harry O. Hempy; Charles R. Kirkpatrick; Francis L. Robinson, all of Tucson, all of Ariz.

[73] Assignee: International Business Machines Corporation, Armonk, N.Y.

[21] Appl. No.: 241,286

[22] Filed: Mar. 6, 1981

[51] Int. Cl.³ .......................................... G11B 27/02
[52] U.S. Cl. .................................................. 364/900
[58] Field of Search ... 364/900 MS File, 200 MS File

[56] References Cited

U.S. PATENT DOCUMENTS

| | | | |
|---|---|---|---|
| 3,736,567 | 5/1973 | Loton et al. | 364/200 |
| 3,828,323 | 8/1974 | Heitman et al. | 364/900 |
| 3,838,396 | 9/1974 | Martin | 364/900 |
| 3,916,382 | 10/1975 | Martin et al. | 364/900 |
| 4,041,463 | 8/1977 | Slutzky et al. | 364/900 |
| 4,075,686 | 2/1978 | Calle et al. | 364/200 |
| 4,080,651 | 3/1978 | Cronshaw et al. | 364/200 |
| 4,156,278 | 5/1979 | Wilhite | 364/200 |

Primary Examiner—Gareth D. Shaw
Assistant Examiner—Daniel K. Dorsey
Attorney, Agent, or Firm—H. F. Somermeyer

[57] ABSTRACT

In a buffered data storage subsystem, data is promoted to the buffer in anticipation of a connected host using the promoted data in the near future. In a tape recorder data storage apparatus the actual position of the tape reflects the last promoted data; such actual tape position is "inconsistent" with host operations. If the sequence of host operations continues, such inconsistency actually enhances total operations. When the subsystem detects a change or possible change in future host operations (rewind command, change in tape motion direction, etc.), detect end of file (tape mark) or a change in subsystem operations (load balance affecting drive or deallocation of buffer from drive) the data promoted to the buffer and not read by the host is erased from the buffer. The tape is moved such that upon a forward motion the tape drive would next read data on tape corresponding to the data block erased from the buffer.

7 Claims, 16 Drawing Figures

CONTROLLING BUFFERED PERIPHERAL SUBSYSTEMS

FIELD OF THE INVENTION

The present invention relates to control of buffered peripheral subsystems particularly those subsystems having data signals which are prefetched to a buffer from a plurality of units in the peripheral subsystem and can have status altered for invalidating the prefetched data.

BACKGROUND OF THE INVENTION

It is common practice to employ an electronic data buffer between intermediate data units for enhancing data exchanges between the units. It is particularly advantageous to provide an electronic buffer between an electro-mechanical data processing device and a completely electronic data processing unit. An example of such an arrangement is a magnetic tape drive coupled to a central processing unit (CPU) which is a host or host processor to the tape drive. The idea is to mask or hide the relatively slow electro-mechanical device actions from the electronic data processing unit. An example of such masking is shown by R. A. Gregory, et al U.S. Pat. No. 2,960,683. An electronic data buffer, storing a block of data, was interposed beween a CPU and a magnetic tape drive of the vacuum column type. This buffer-masking arrangement has been extended conceptually to include so-called cache memories which completely, at least in theory, mask one unit from another unit. Such cache memories are generally employed between the main memory and a processing unit of a CPU. Such "caching" has also been extended to peripheral subsystems such as in the IBM 3850 Mass Storage System available from International Business Machines Corporation, Armonk, N.Y. In the IBM 3850 system, a plurality of direct access-storage devices (DASD) completely mask operation of an automatic magnetic tape library. While the IBM 3850 system provides an enormous storage subsystem, not all storage subsystems need to reach the performance and storage capability of the IBM 3850 system. Detailed descriptions of the IBM 3850 MSS are found in publications available from International Business Machines Corporation, Armonk, N.Y. identified as GA32-0028, "Introduction to the IBM 3850 Mass Storage System (MSS)" 1974; GA32-0035, "IBM 3850 Mass Storage System (MSS) Principles of Operation; Theory" 1978; GA32-0030, "IBM 3850 Mass Storage System (MSS) Installation Guide" 1977; and GA32-0029, "IBM 3850 Mass Storage System (MSS) Principles of Operation" 1975.

Accordingly, it is desired to provide a data buffer in a tape storage subsystem between a plurality of tape drives and a plurality of hosts via a plurality of input-/output channel connections. The buffer is to be shared by the plurality of tape drives such that the number of buffer storage segments of the buffer is less than the number of tape drives. It is also provided that data is transferred from a magnetic tape drive to its allocated buffer segment in anticipation of a request from a host 15 prefetch. This so-called prefetching can result in data being transferred into the buffer from a tape drive and that host or other activities then occur requiring that the prefetched data not be used. At this time, corrective action has to be taken in the subsystem for maximizing performance. It is a purpose of the present invention to provide that corrective action at minimum cost while maintaining a maximal performance level.

SUMMARY OF THE INVENTION

It is an object of the present invention to provide an efficient peripheral storage subsystem which allows prefetching of data and having an efficient performance recovery technique and apparatus for eliminating prefetched data from a buffer in the subsystem.

In accordance with the invention, a method of operating a tape recorder with a data buffer includes transferring blocks of data from the tape recorder to the buffer in anticipation of future requirements for the data, tallying the number of blocks of data resident in the buffer, changing a mode of operation of the tape recorder independent of said transfer blocks of data; then in response to said change in mode of operation erasing or purging the data from the buffer and simultaneously activating the tape recorder to reposition the tape to next sense data on the tape corresponding to the first or oldest block of data that was purged from the buffer.

Apparatus in accordance with the invention, includes a buffered (tape) recording subsystem having a plurality of (tape) recorders with a common buffer with allocatable segments for each (tape) recorder. Control means are provided for selectively promoting data from the tape recorders to the buffer in anticipation of future host requirements of the data. Means indicate a predetermined change in future subsystem actions with respect to a given one of the tape recorders, wherein certain data from the one tape recorder has been promoted and currently resides in the buffer. Buffer control means responsive to the indication to purge the means connected to the one tape recorder actuates the one tape recorder to reposition its tape in the one tape recorder so as to next read data on the tape corresponding to the data erased from the buffer by said buffer control means and which had resided in the buffer the longest of any such erased data. The term logical device means the peripheral unit plus its currently allocated buffer segment.

The foregoing and other objects, features and advantages of the invention will be apparent from the following more particular description of preferred embodiments of the invention, as illustrated in the accompanying drawings.

THE DRAWINGS

FIG. 6 is a partial showing of a buffer record table (BRT) used in connection with illustrating the present invention.

DETAILED DESCRIPTION

Referring now more particularly to the drawings like numerals indicate like parts and structural features in the various diagrams. In describing the invention, the terms tape recorder, magnetic tape drive, tape drive, tape unit and tape device are intended to be synonyms and are used interchangably in this description.

Figure 1:
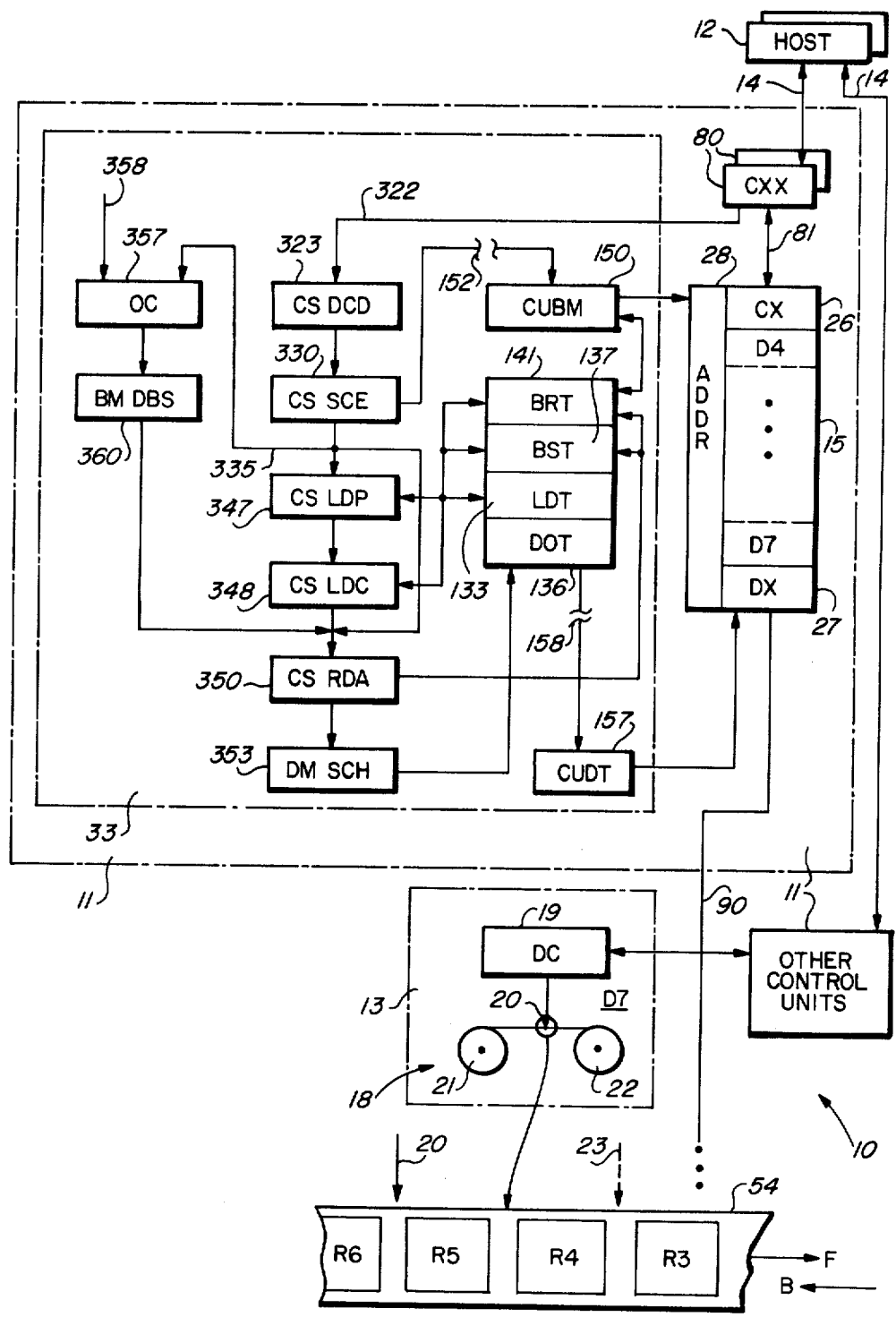
FIG. 1 illustrates a system employing the present invention.

FIG. 1 illustrates a peripheral subsystem 10, in simplified form, connected to a host 12 for transferring data signals between such host and one of a plurality of magnetic tape recorders 13. Data signals are exchanged directly with the host 12 over input/output connection 14 (connection 14 represents a channel in the data processing art). Included in a control unit 11 of peripheral subsystem 10 is a data buffer 15. A plurality of segments of data buffer 15, shown in FIG. 1 as segments D4 (ellipsis) through D7 are dynamically allocatable to tape recorders 13. A control 33 manages buffer 15 via CUBM 150, later described. The operation is such that data signals are transferred from tape recorders 13 to the various buffer 15 segments, thence to host 12; or in the reverse direction from host 12 through the buffer 15 segments to devices 13. The present invention is concerned with the direction of data transfer from tape recorders 13 through buffer 15 to host 12. The arrangement is such that data from a tape unit 13 is read into buffer 15 before the host 12 requests it. This action provides shorter data access, better input/output channel (14) utilization and thereby providing more efficient data processing operations. There are several circumstances in which such data transferred ahead of time, hereinafter referred to as read ahead data, for a given addressed tape drive, has to be purged or erased from a buffer 15 segment. The tape drive in a plural control unit 11 subsystem, can be transferred from one control unit to another on a dynamic basis for balancing the loads of the control units 11. Therefore the allocated buffer 15 segment in the illustrated control unit 11 must be erased and another buffer 15 segment of another control unit (as described with respect to FIG. 2) will be allocated to the transferred tape recorder. If the tape recorder 13 having an allocated segment buffer 15 becomes relatively inactive due to host 12 change in activities, then a replacement control can reassign or reallocate the buffer 15 segment to another tape recorder 15. If during reading operations, i.e., transfer of data signals from a tape recorder 13 to host 12, the direction of tape motion is reversed by the host, then all of the data in the allocated buffer 15 segment is from the wrong portion of tape. Accordingly, at this time that read ahead data is erased by destroying addressability to such data. Also host 12 can send a command to storage subsystem 10 changing the mode of operation from a read mode to a write mode, i.e., transfer of data signals from host 12 to a tape recorder 13. In this instance host 12 is telling storage subsystem 10 that no more read ahead data is required and therefore it should be purged or erased. This erasure will make the buffer 15 segment available for the data to be written onto tape recorder 13.

In each of the above-described circumstances the magnetic tape recorder 13 repositions its tape 54 as follows: The first step is to determine the number of blocks of data in the allocated buffer 15 segment. The number determined results in the magnetic tape 54 being forward-spaced a number of blocks equal to the number of data blocks in the buffer. The forward-spacing can either be in the forward or backward direction of tape motion depending upon the direction of tape motion when the data was read. This point will be expanded upon later. As tape 54 is moved block by block, the entries of a so-called buffer record table (BRT) 141 for the respective blocks on the tape 54 are deleted. This action destroys the addressability of data in the buffer 15 segment corresponding to the data on the tape being spaced over. When the last block is spaced over on tape 54, BRT 141 no longer has any entries for the addressed tape recorder 13; then the buffer 15 segment for the addressed tape drive 13 is marked as being empty. At this point in time any new operation indicated by host 12 can be initiated i.e., such as writing to the addressed tape recorder 13, reading data from tape recorder 13 in a reversed direction, transferring the tape recorder 13 to another control unit and the like.

Repositioning tape 54 upon erasure of data from buffer 15 segment provides an advantage in that any subsequent read command can be achieved without moving the tape 54 over the blocks on tape 54 corresponding to blocks erased from buffer 15 to get to the record that was the oldest or first recorded into buffer 15 from this addressed tape recorder 13. The synchronous purging of data blocks from buffer 15 segments and the movement of the tape 54 during repositioning keeps the contents of the buffer and the tape 54 position consistant such that a control unit 11 need not keep separate information about the tape 54 position relative to the contents of buffer 15. Also either control unit 11 in a two control unit subsystem, can enter into the control of the addressed device 13 without having to provide special communications with another control unit about the tape 54 position relative to buffer 15 contents.

Each tape recorder 13 includes a tape transport mechanism 18 controlled by a device controller DC 19 and is connected to buffer 15 via a control unit to device connection 90 and automatic data transfer circuits DX 27. The illustrated tape recorder 13 has an address D7. The buffer 15 segment labeled D7 is the allocated buffer 15 segment for this device. Device control DC 19 transfers recording signals to and receives sensed signals from tape 54 via transducer 20. Tape transport 18 moves tape 54 across transducer 20 between a machine reel 21 and a supply reel 22. The machine reel 21 is permanently mounted upon tape transport 18 while supply reel 22 is a removeable reel, preferably within a cassette or cartridge. In the alternative, both reels 21 and 22 can be in a two spool cassette. For purpose of describing operation of the invention, transducer 20 is shown as being positioned between records R5 and R6 on tape 54. Reading is assumed to be in the forward direction indicated by arrow F. Records R3, R4 and R5 have already been transferred from tape recorder 13 to buffer 15 segment D7. Record R3 has been transferred to host 12. This state of affairs means that records R4 and R5 remain in allocated buffer 15 segment D7. Insofar as host 12 is concerned the virtual position of tape 54 is indicated by dash line arrow 23. That is, upon the next read command from host 12 to storage subsystem 10, record R4 will be fetched directly from buffer 15. When host 12 sends a write command or makes other changes as indicated above, the records R4 and R5 are erased from allocated buffer 15 segment D7 synchronously or asynchronously to tape 54 being moved in the backward direction indicated by arrow B. As transducer 20 scans record R5, then R4 and then comes to rest at the position indicated by dash line arrow 23, the virtual and real positions of tape 54 are identical. Records R5 and R4 have been erased from allocated buffer 15 segment D7 and tape 54 is positioned to next read record R4 when reading in the forward direction F.

Data transfers between host 12 and tape recorder 13 is via input/output channel 14 thence a plurality of channel adapters 80, denominated as CXX in FIG. 1. Communications during automatic data transfers continue over bus 81 to automatic data transfer circuits CX 26 thence into buffer 15. This operation is asynchronous with respect to device 13 to buffer 15 transfers which are handled automatically by DX 27. Addressing of buffer 15 through an automatic data transfer is automatically handled by addressing circuit 28 in the usual manner. Control 33 synchronizes the operation and sets up and terminates the above-described automatic data transfers.

Host 12 issues an input/output command over I/O channel 14 and through channel adapter 80 to control 33 in the usual manner. As shown in FIG. 1, the input/output commands travel over path 322 to reach-microcode logic module CS DCD 323. Herein control 33 decodes the received commands and performs other functions as will become apparent. Then logic module CS SCE 330 is activated to begin execution of the received command. This execution may include supplying a channel command retry (CCR) to the host 12, as is well known. Activation of various other logic modules is via common path 335, including activation of other command modules OC 357, not described. These other command modules can also be activated by other means as indicated by arrow 358. Further, control 33 from logic module CS SCE 330 will activate management of buffer 15 by a group of logic modules CUBM 150. CUBM 150 may be reached via a set of command execution modules represented by numeral 152. Operations of the hereinafter described logic modules are coordinated by a plurality of registers showing status information of the buffer 15 and the other elements of storage subsystem 10. These registers not only include buffer record table BRT 141, but also buffer status table BST 137, logical device table LDT 133, and device operation table DOT 136. Tables BST 137 and BRT 141 are closely associated with operation and management of buffer 15. Logical device table LDT 133 concerns the operation of the combination of an allocated buffer 15 segment with an addressed device 13. Device operation table DOT 136 handles the asynchronous operations of the tape recorders 13 with respect to buffer 15 in a plurality of queues: that is, control 33 schedules a tape recorder 13 operation in one of three queues. A control comman queue CCQ for activating an addressed device 13 for providing a control motion, such as rewind; an information exchange queue ICQ for fetching status information and other operational status signals from an addressed device 13; and finally a work or data transfer queue XQ which provides for a setup of automatic data transfers between buffer 15 and an addressed device 13. Operation of each tape recorder 13 is monitored and coordinated from DOT 136 by a set of logic modules CUDI 158, later described, and CUDB 157. These logic modules also set up automatic data transfers through DX 27 including automatic addressing via address circuits 28. Returning to logic module CS SCE 330, when a command affects a logical device, as occurs when practicing the present invention in the illustrated storage subsystem, logic module CS LDP 347 is activated to alter contents of tables as will be later described and which in turn activates logic module CS LDC 348. Modules 347 and 348, inter alia, set up the control unit 11 for the erasure of data and repositioning of tape 54. The erasure and repositioning via logic modules CS RDA 350 and DM SCH 353. Deallocation of a buffer segment can be caused by various activities of the storage subsystem 10. This is indicated by arrow 358 activating logic module OC 357 which in turn activates logic module BM DBS 360 which deallocates the buffer 15 segment. BM DBS 360 activates CS RDA 350. A more detailed description follows.

Figure 2:
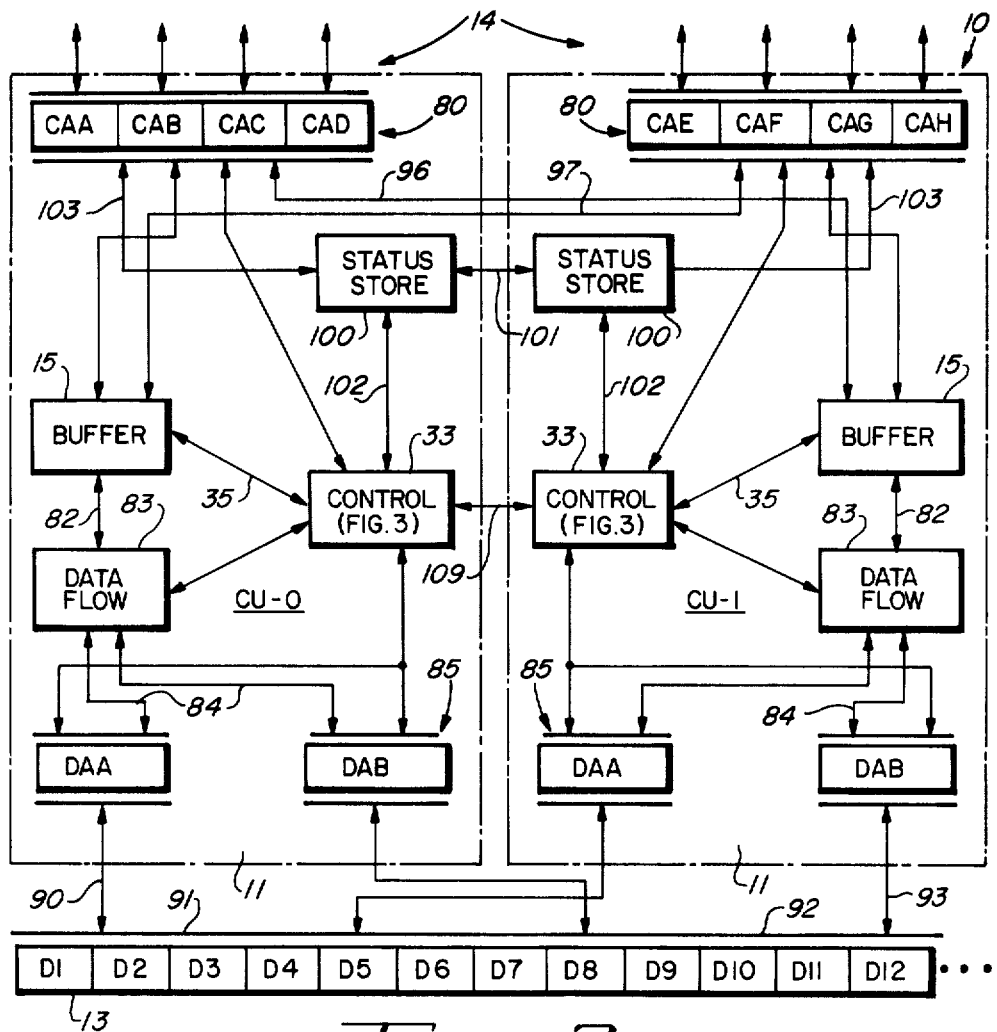
FIG. 2 illustrates a peripheral subsystem which may advantageously employ the present invention.
Figure 3:
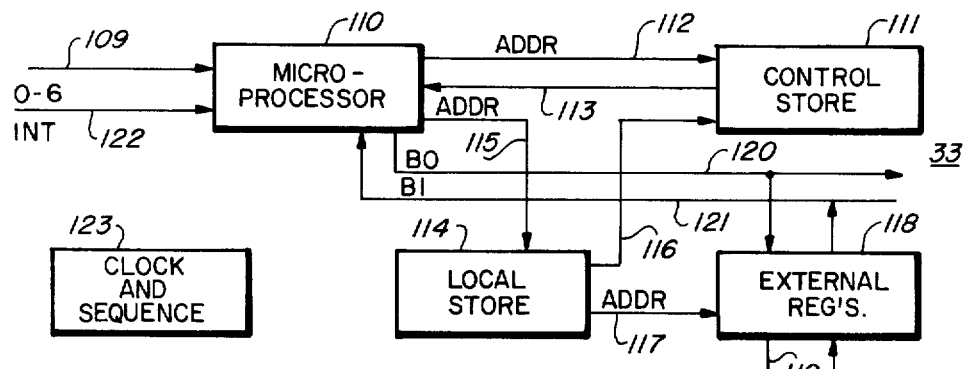
FIG. 3 is a logic diagram of the control portion for the FIG. 2 illustrated peripheral subsystem.
Figure 4:
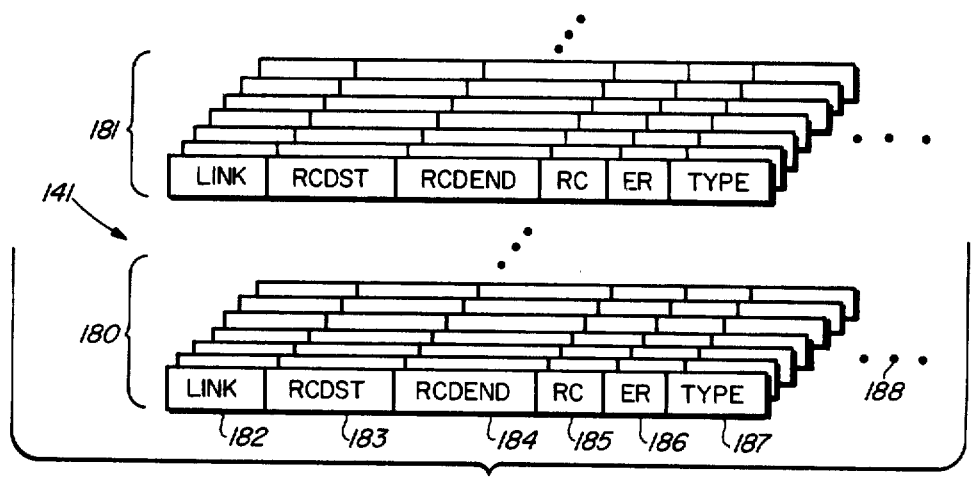
FIG. 4 is a map of a control memory used in connection with the FIG. 3 illustrated control and which includes elements of the present invention.

Before further describing the invention, the environment in which the invention preferably resides is described with particular reference to FIGS. 2-4 which illustrates a storage subsystem employing reel-to-reel tape drives denominated as devices 13 D1-D12. The preferred arrangement includes two control units 11 denominated as CU-0 and CU-1. The arrangement is such that any of the devices can be connected to the host 12 via input/output channel 14 through either of the control units, CU-0 or CU-1. The attachment to a host 12 by each of the control units 11 is via a plurality of channel adapter circuits 80 which are individually denominated CAA-CAH. Each of the channel adapters 80 can communicate directly with a buffer 15 in either control unit 11. Both CU-0 and CU-1 are identically constructed. Accordingly, like numerals are indicating like parts in the two control units with the interconnections between the control units being separately denominated. Channel adapters CAA-CAD are in CU-0 while CAE-CAH are in CU-1. The respective channel adapters communicate with a buffer 15 in its own control unit via cable 81. Communications from the buffers to the devices 13 is over cable 82 through a data flow circuit 83, thence to cable 84 through a plurality of device adapter circuits 85. The device adapter circuits are separately denominated by characters DAA through DAQ in both control units 11. Data flow circuits 83 contain recording circuits. The programmed control 33 is electrically connected to all of the described portions of the respective control units 11 and operates generally in a known manner for storage subsystems as generally shown in Irwin U.S. Pat. No. 3,654,617, filed in U.S.A. Oct. 1, 1970, application Ser. No. 77,088.

The interconnections between the control units 11 and the devices 13 is on a primary/secondary basis. Devices D1-D7 are primary to CU-0 and secondary to CU-1. In a similar vein, devices D8-D15 (D13-D16 not shown) are primary to CU-1 and secondary to CU-0. The significance of primary and secondary connections relates to which of the control units CU-0 or CU-1 maintain status for the respective devices; i.e., the control unit CU-0 maintains status information for D1-D8 while CU-1 primarily maintains status information for D8-D16. As will become apparent, both control units CU-0 and CU-1 memorize status indications for all of the devices 13. In the primary connections, adapters DAA-DAB of CU-0 are connected via a cable 90 to all of the devices D1-D8. In a similar manner, the connection to D8-D16 to CU-1 is via cable 93 through adapters DAA-DAB. The secondary connection from CU-0 to devices D8-D16 is via cable 94 while CU-1 is connected to devices D1-D8 via cable 95. The operations between the device adapters 85 and the various devices D1-D15 includes tage control lines and bus data transfer lines which enables the control units 11 to closely control and operate devices 13.

In prior tape subsystems, the data flow paths were not fully multi-pathed in that the channel adapters 80 communicated only with the data flow circuits 83 in its respective control unit 11. In the preferred configuration, any of the channel adapters CAA-CAH can communicate with any of the devices 13 through either data flow circuit 83. The internal control unit 11 connection from the channel adapter CAA through CAD and adapter CAE-CAH of CU-1 are as previously described. Connections from channel adapters CAA-CAD to the buffer 15 of CU-1 is via cable 96 whereas channel adapter CAE-CAH connects to the buffer 15 of CU-0 via cable 97. Accordingly, either data flow circuit 83 or buffer 15 can communicate with any of the hosts via any of the channel adapters. This arrangement, of course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as-by selecting a device 13, the status store 100 in CU-0 immediately communicates to status store 100 in CU-1. Similarly, any crossconnection between the channel adapters 80 and the buffers 15 is immediately indicated in both status stores 100. Each of the status stores 100 contain a plurality of registers for containing bits relating to device status, buffer status, channel status and the like. Such status information reflects the selection status of the device, its busy status, contingent connections and all other status necessary for operating the storage subsystem with the input/output channel 14.

One and only one control unit 11 can change the configuration of the storage system at a given time. In this regard, cables 102 extend from the respective status store 100 to control 33. When control 33 of CU-0 wants to change logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Either CU 11 having the master state is the only one which can change logical configuration of the subsystem; the master state being shifted between the control units as configuration changes dictate. Status stores 100 also communicate with the respective channel adapters in the control units 11 via cables 103. Such communication includes the supplying of device busy status to the channel adapters from the status stores and the request for selection from the channel adapters to the status stores; that is, if CAB 80 wants to select device D6 on behalf of a host request. CAB 80 communicates with its status store 100 of CU0 requesting that the device D6 be selected. Status store 100 will supply the busy or not busy, ready and not ready status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with micromode program stored in control store 111. Such microprogram enable microprocessor 110 to completely manage buffer 15, to provide supervised data flow circuit 83, to communicate with status store 100, and to supervise and enable selection of the channel adapters 80 and device adapters 85. Further communication between controls 33 in the two CU's 11 on a processor-to-processor basis is via cable 109 using known interprocessor communications techniques. Using known techniques, microprocessor 110 selects the microprogram of control store 111 via address bus 112. Control data is supplied from the control store 11, including microprogram instruction words, via bus 113. Of course, the usual idle scan loop for operating microprocessor 110 is resident in control store 111. Additionally, control 33 includes local store 114 which acts as a working control store for microprocessor 110. The addressible registers of local store 114 are addressed via bus 115. Bus 116 transfers signals from local store 114 to control store 111 under control of microprocessor 110; that is, it is preferred that the data stored in control store 111 from microprocessor 110 be transferred via local store 114. Communications between control 33 and all of the items shown in the control units 11 is via sets of external registers 118 which are addressed by address signals supplied over bus 117 from local store 114, to limitation thereto intended. Communications from external registers 118 to the various elements of the control units 11 is via a pair of unidirectional buses 119 which are electrical connections made in the usual manner.

Microprocessor 110 includes the bus out BO 120 and a bus in BI 121 which are connected to local store 114, external registers 118 and other units as may be desired. Microprocessor 110 is interrupt driven through a plurality of interrupt levels. These interrupts are supplied by the various elements of the control unit 11 over bus 122 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, but sequences microprocessor 110 for initializing control 33 to properly operate the control unit 11. The connections 119 from external registers 118 are to all the other portions of control unit 11.

FIG. 4 is a map of control store 111 showing control tables and microprogram groups. The tables, of course, contain those signals representing control information necessary for the successful operation of the storage subsystem. First the tables are described.

CUT 130 is a so-called control unit operation table which contains information-bearing signals pertaining to the entire control unit 11. This table relates to the operational status of the individual control unit CU-0 and CU-1 and which is not device 13 nor channel 14 related. CST 131 is a command status table which contains information-bearing signals describing the current command status which is being executed for an addressed device 13; that is, host 12 supplies channel commands over I/O channel 14 to the respective control units 11. CST 131 reflects the present status of the execution of those commands received by any of the channel adapters 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15 and the broad operational status of the respective devices which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table of the circular type. HID 135 is a table containing host identification signals for the hosts 12 communicating with the control units 11 via channel adapters 80. DOT 136 relates to device operations and contains information-bearing signals signifying schedule, active and completed device 13 operations. Such operations include tape transport, reading and writing and the like. BST 137 contains information-bearing signals relating to the status of the buffer 15. Such information-bearing signals relate to data tranfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information signals signifying device information, control data relating to devices 13 and concerned with input/output channel 14 as well as intercontrol unit communication over cable 109 is stored here. Such information may originate because of device 13 operations as well as channel 14 operations. DST 140 stores information bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain characterizing signals showing the status of the record with respect to its storage in buffer 15.

DIAG 142 is a table used to control diagnostic functions executed in the control unit 11. CXT 143 contains information-bearing signals relating to transfer of signals between buffer 15 and any of the I/O channels 14 via the channel adapters 80. Such information includes direction of transfer and the address of the device 13 related to such transfer. SNS 144 holds information-bearing signals representing sense data to be reported to a host 12 as well as a so-called buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical storage units. Path group table PGT 147 complements PGM 146 in that it includes identification signals identifying the logical partition and which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Various program groups include CUBM 150 which are the microcode programs relating to the management of a buffer 15. CUCB 151 identifies those microcode programs relating to the transfer of signals between an I/O channel 14 and buffer 15 via channel adapters 80. CUCE 152 relates to setting up the tables described above in preparation for executing a command received from a host 12 over input/output channel 14. CUCH 153 relates to the channel control aspects, such as device selection and the like. SUSV 154 relates to an interrupt supervisor as it uses scan vectors in determining priority of the interrupts. CUCS 155 is a command support set of microcode which executes the commands set up by CUCE 152. CUDB 156 relates to the control and supervision of signal transfers between devices 13 and buffer 15. CUDI 157 relates to the control of the device adapters 85. CUCM 158 relates to the management of devices 13 such as scheduling their operations, etc. CUMD 159 relates to error detection and recovery microcode. CUMD 160 relates to diagnostic procedures executed by a control unit 11. CUSN 161 relates to handling sense data such as stores in SNS 144. Numeral 163 indicates that the above program groupings may be modified and extended as the need arises for a storage subsystem.

Figure 5:
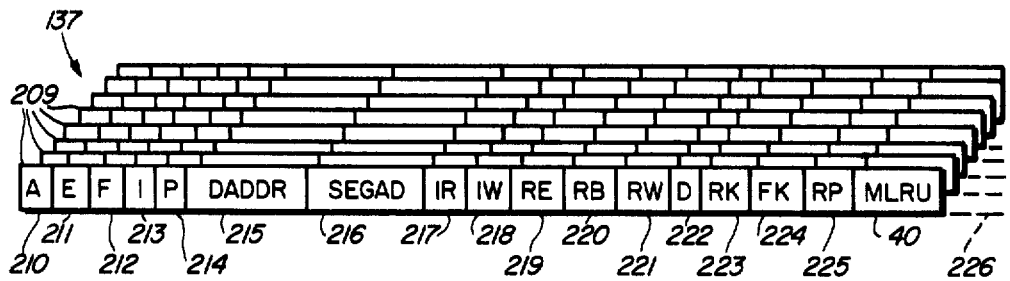
FIG. 5 is a partial showing of a buffer status table (BST) used in connection with illustrating the present invention.

BST 137, shown in FIG. 5, has eight registers 209, each of which correspond to a segment of buffer 15. If there are ten segments of buffer 15 then there are ten registers 209. The information contained in BST 137 relates to data transfers, buffer 15 segment allocation and load balancing. Access to BST 137 is by indirect addressing through LDT 133, as later described. Each of the registers 209 include the following described signal areas or sections for controlling operations involving the respective buffer 15 segments. Section A 210 indicates whether or not the indicated buffer segment is allocated to a device 13. When allocated, the combination of the allocated segment and a device 13 constitutes a logical device. E section 211 indicates whether or not there is an outstanding or pending channel command involving the buffer segments. The term E means engaged in execution of a channel command. F section 212 signifies whether or not the indicated segment has been scheduled for deallocation, i.e., freeing. Note the A section 210 indicates whether or not the represented segment is allocated or freed (deallocated). I section 213 indicates whether or not the segment is operative; when I is active then the segment is inoperative. P bit 214 indicates whether or not the segment is paired with another segment. By arbitrary convention a lower numbered even segment is paired only with a next higher numbered odd segment. That is, 0 and 1 can be paired but not 1 and 2. Similarly, segments 2 and 3 can be paired but not 3 and 4. When segments 2 and 3 are paired, then the macro segment is referred to as section 2. DADDR section 215 contains the address of the device 13 to which the indicated segment is allocated. DADDR also becomes the address of the logical device formed by the combination of the allocated segment and device 13. SEGAD section 216 contains the beginning and ending address of the segment in buffer 15, in a paired segment the ending address is the ending address of the next higher numbered odd segment.

IR bit 217 is active when a data transfer with a device is started and not yet completed. This bit is used in the read mode. IW bit 218 is set when the signals are being transferred from buffer 15 to a device 13 of a record to be recorded before the channel transfer has been completed. Bits 217 and 218 are used in device 13 control for keeping the tape moving once a data transfer has been initiated. RE bit 219 is active when a channel and device are streaming data through a buffer segment simultaneously. This bit indicates that the device will be reconnected to the channel for streaming data transfer operations. Streaming data transfer operations indicate that an entire series of data records are being transferred as a series of bursts without substantial interruptions. RB bit 220, when active, indicates a READ DATA BUFFER command is being executed. The READ DATA BUFFER command is executed through microprocessor 110 using logic module CE RDB (not shown). RW bit 221 indicates the mode of the logical device, i.e., read or write. D Bit 222 indicates the direction of tape motion, i.e., forward or backward. RK section 223 indicates the number of records contained in a buffer 15 segment. This number of records will correspond to the number of BRT 141 entries currently active for the indicated buffer 15. DK section 224 indicates a number of free bits of data currently in a buffer 15 segment. The number of free bits indicates to microprocessor 110 the number of records that can be read ahead from a device 13 to a buffer segment in a read mode. RP section 225 contains recorder pointers, i.e., two addresses which point to the BRT 141 registers respectively for the first and last record stored in a buffer segment. The intermediate records are found through the linked lists of BRT 141. MLRU section 40 constitutes the most recently used and least recently used double linked entry list used in connection with promoting data and demoting data between buffer 15 and devices 13. This section has been described with respect to FIG. 1 earlier. Ellipsis 226 indicates that additional entries may be used in BST 127 for controlling a buffer segment in aspects not pertinent to an understanding of the present description.

BRT 141 is described with reference to FIG. 6. BRT 141 contains a plurality of registers arranged into plural sets of linked-list registers 180, 181 one set for each buffer 15 segment allocated to a device 13 that currently is storing at least one record. For example, if there are four allocated buffer segments in buffer 15, then there will be four sets of BRT 141 registers that form linked-list registers. Every record stored within a given buffer segment will have one associated entry in BRT 141 in a respective register in the associated sets of registers 180, 181. The linked-list registers link all entries together such that each and every record in the segment is linked to every other record in chronological sequence of receipt such that the buffer segment operates as a FIFO buffer. The linked-list BRT 141 registers are logically associated and can be dispersed throughout control store 111 within a given address range; that is, each linked-list register is not necessarily adjacent to other registers in the same linked-list. Accordingly, the maximum number of entries into BRT 141 for all of the segments in buffer 15 is dependent upon the unused registers 180, 181. At a given instant, before a BRT 141 register is allocated to a record, a test is made by control 33 via microprocessor 110 to determine whether or not the respective buffer segment has more or less than one half of the available BRT 141 registers allocated to it. If more than one half, then no more BRT entires will be allocated to that segment, thereby indicating that the buffer segment is full because of limitations in BRT 141 entry storage capability. The linked-lists of BRT 141 entires are addressed via BST 137; that is, each BST 137 register has an address pointing to the BRT 141 register that contains the first received record in the segment associated with the BST 137 register. As records leave buffer 15, this pointer is adjusted to dynamically point to the BRT 141 entry corresponding to the instant first-received record in the buffer segment.

For purposes of explaining the present invention, some sections of BRT 141 registers are described. A first section 182 contains the link to the nest BRT 141 entry associated with that given segment. The register associated with the first record in any segment is pointed to by BST 137. That first register has its section 182 with an address pointing to the next register associated with the second received record, etc. As records are removed from the buffer segment, the link lists are updated using known data processing techniques. Register section 183 contains the address in the associated buffer segment at which the identified record stored in the buffer segment has a starting address. In a similar manner register section 184 stores the ending address for this identified record. The second register in BRT 141 has a record starting address in section 183 which is one greater than the ending address stored in section 184 of the first BRT 141 register, etc. RC sections 185 contains indicia indicating the completeness of the record; that is, whether or not a complete record is presently stored in the associated buffer segment. The same bit also indicates validity of subsequent linked entries in the BRT 141 registers. Section 187 indicates the type of record stored. That is, data, image, non-coded information, tape mark, erase gap information, density marks or other control or data types that may be used in connection with the operation of peripheral subsystems of diverse types. Ellipsis 188 indicates that a typical BRT 141 may have additional sections for the operation of a subsystem which are not pertinent to an understanding of the present invention.

Figure 7:
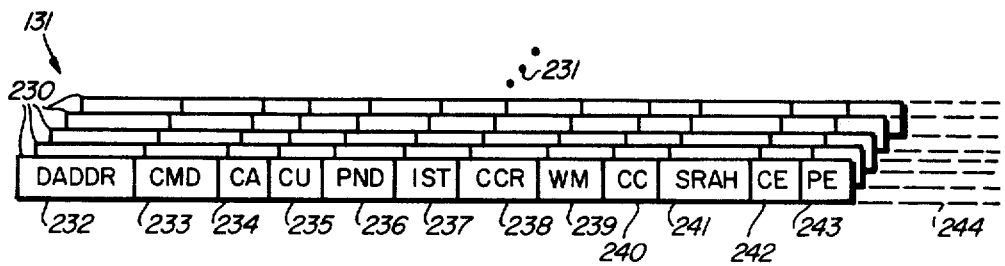
FIG. 7 is a partial showing of a command status table (CST) used in connection with explaining the present invention.

FIG. 7 shows CST 131 as having a plurality of registers 230. Some registers (not shown), as indicated ellipsis 231, have a series of entries for containing information about a command received from a host 12 that is currently being executed with respect to an addressed device 13. The registers are arranged by device address. Generally CST 131 is controlled by the logic modules in groups CUCS 155 and CUCE 152. If there is no current command being executed then there is no entry in CST 131 for a given device 13. Section DADDR 232 holds the address of the device 13 for which a command was received. CMD 233 contains the command code that specifies what channel command is being executed or is to be executed. CA section 234 identifies the channel adapter 80 over which the command was received. CU section 235 indicates which control unit 11 received the command. Because of the cross connections between the channel adapters and the buffers 15, either control unit 11 can execute any command. That is, a command can be first received by CU-0 and then later transferred to CU-1 using load balancing techniques beyond the scope of the present description. PND bit 236 indicates that a command is in progress for the device indicated by DADDR 232. 1st bit 237 indicates whether or not a first aspect of a received command has been completed. That is, each command execution can have preparatory and executory phases. When bit 237 is active the preparatory phase has been completed. CCR bit 238 indicates that a channel command retry has been reported to the host 12 and has been accepted by CNL 16 with respect to the addressed device. WM bit 239 indicates whether or not the corresponding device is operating in the buffer write mode or the tape write mode. LDT 133 handles the tape synchronous modes CC bit 240 indicates that command execution has to continue. As an example, CNL 16 disconnects from CU-0, then CNL 16 has to be later notified that a particular device operation has been completed; CC 240 is set at time of disconnection from CNL 16. SRAH bit 241 suppresses read ahead of data from a device 13 to buffer 15. Read ahead is inhibited when a tape mark has been read or written or a command such as LOCATE BLOCK, REWIND, or REWIND UNLOAD has been initiated. That is, hoist 12 has indicated a major change in data processing operations. CE bit 242 indicates that a CHANNEL END has been sent and accepted by CNL 16; a DEVICE END is still owed by the addressed device. PE bit 243 indicates that a permanent error has occurred and data to be recorded still resides in the allocated buffer segment. When a tape motion command is received from host 12, all existing data in the buffer 15 segment will be deleted. Ellipsis 244 indicates that additional entries and information will be stored in CST 131, which information is not necessary for an understanding of the present description.

Figure 8:
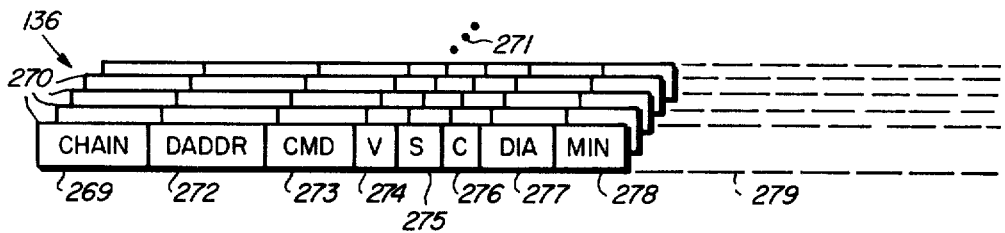
FIG. 8 is a partial illustration of a device operation table (DOT) used in connection with explaining the present invention.

Device operation table DOT 136 has one register 270 for each of the devices 13. FIG. 8 shows five of those registers with the other registers being indicated by ellipsis 271. Device operation table 136 contains information about schedules, active and completed device 13 operations. Three queues for scheduled device 13 operations exist in DOT 136; all the queues are constructed and reside in chain section 269 which contains a pointer to the next DOT 137 register in the respective queue. Chain 269 is always the left-most section of each of the registers 270. If chain 269 is empty, then there are no further devices queued in the respective queue. These queues are respectively for commanding a device 13 to obtain sense data (ICQ), control device operations independent of data transfers (CCQ), and data transfer operations (XQ). Each queue is a FIFO schedule of the three different types of operations. The address of the DOT 136 containing the first address of the first device in each queue is contained in pointers in work registers (not shown) within microprocessor 110. DADDR section 272 contains the address of a device 13 indicated by the corresponding register 270. CMD section 273 contains the command code for a device operation. The coding pattern of CMD sectin 273 will be different from the coding pattern of the input/output channel command in that CU 11 has a separate set of commands for operating devices 13. These command permutations are not necessary for an understanding of the present invention. V bit 274, when active, indicates that the corresponding device 13 is waiting to execute an operation. If the V bit is inactive, then the other sections within the same register 270 are not valid. S bit 275 indicates that a device operation has started. C bit 276 indicates a completion of a device operation. DIA 277 gives the control store address of the data area for control and information sequences concerning the addressed device 13. MIN 278 indicates the minimum number of records to process for each data transfer operation. When a space operation, i.e., skip some records, is being performed; then the number in MIN 278 indicates the number of records or files to skip over. Ellipsis 279 indicates that DOT 136 may have additional sections within each of the registers 270, which sections are not pertinent to an understanding of the present invention.

Figure 9:
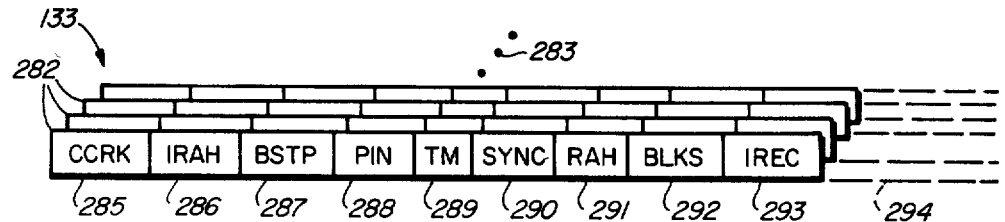
FIG. 9 is a partial showing of logical device table (LDT) used in connection with explaining the present invention.

FIG. 9 shows that LDT 133 has a plurality of registers, four of which are enumerated collectively by 282 and ellipsis 283 indicating identical registers that are not shown. LDT contains current information about each logical device which is not directly related to a particular buffer 15 segment. The segment information is contained in BST 137. There is one register for each logical device; unallocated or inactive devices 13 have no assigned LDT registers (entries). CCRK section 285 indicates the number of CCR's to a heat 12 for the addressed device. This count is reset during a load balancing operation, upon deallocation of a buffer segment or upon receiving a RESET command from host 12. IRAH section 286 inhibits read ahead operations for this particular logical device. BSTP section 287 contains the address of the register 209 of BST 137 for identifying the buffer 15 segment currently allocated to the device 13 for making up the logical device indicated in LDT 133. PIN section 288 indicates that the buffer 15 segment allocated to the device 13 is pinned to this control unit. That is, it is exempt from load balancing activities. TM bit 289 indicates that the last record read was a tape mark. Sync bit 290 indicates that this logical device currently is in a tape synchronous data transfer mode. Note that the read or write mode is indicated by RW bit 221 of BST 137. RAH bit 291 indicates that a current read operation is not scheduled, i.e., the data transfer is a read ahead operation. BLKS section 292 indicates the size of record or signal block of the largest block encountered during this file, i.e., the records between two successive tape marks on a tape 54. Remember that in tape recording, tape marks indicate file demarcation. Ellipsis 294 indicates that additional section for each of the registers in LDT 133 may be employed for exercising control over the logical device beyond the scope of the present description.

The description of the microcode logic modules refer to the modules, such as CS DCD, wherein the "CS" corresponds to the last two characters in the groups CUCS, etc. The three characters "DCD" identify the particular module.

Figure 10:
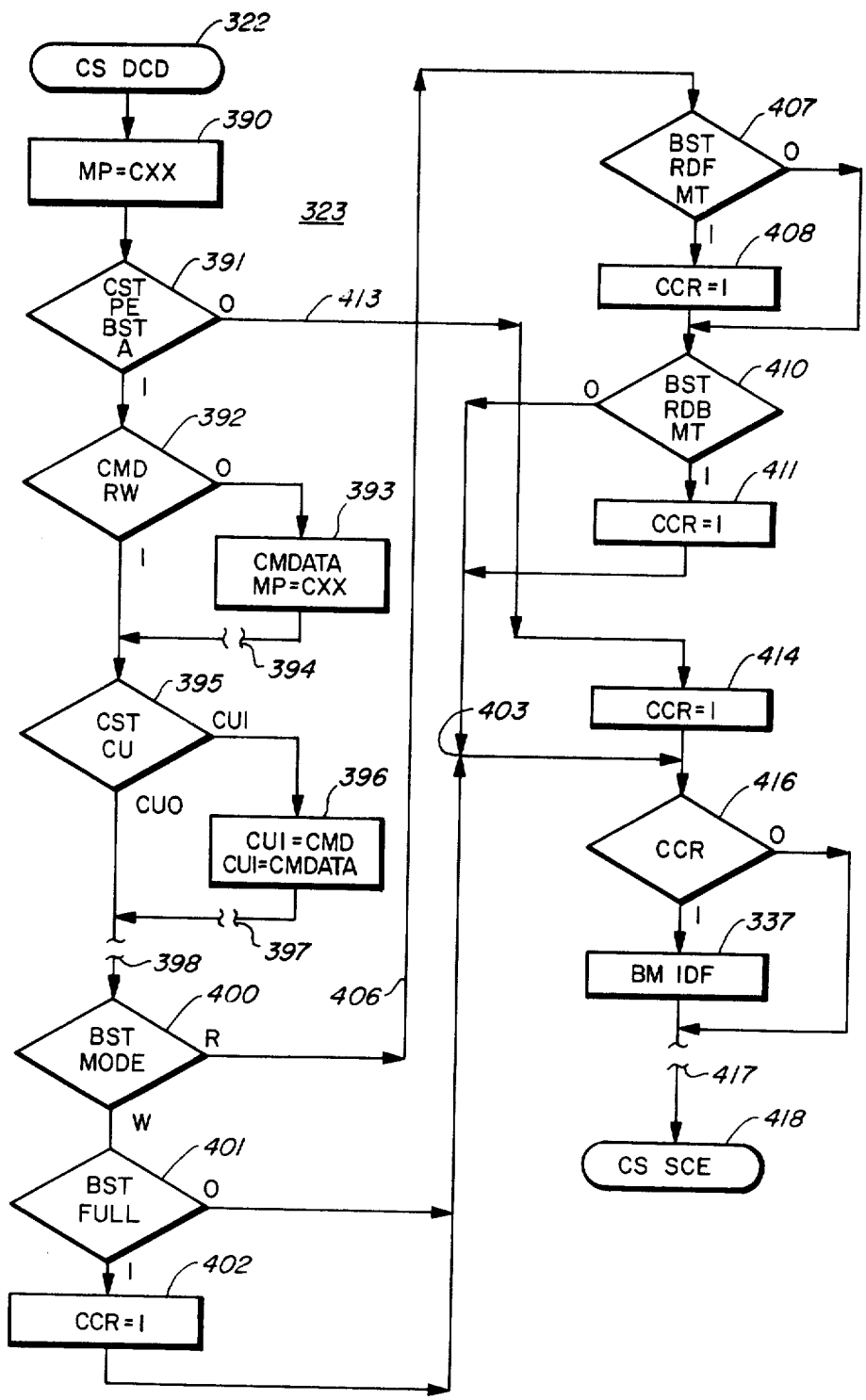
FIG. 10 is a logic diagram illustrating a logic module used in connection with decoding received input/output commands.

FIG. 10 illustrates the microcode logic module CS DCD 323. This logic module is activated at 322 by receiving a command or alternatively by activation internally by microprocessor 110. The first actions at 390 analyze the source of the activation, i.e., whether or not a command was received from an adapter 80 or a message received from the other control unit 11 (OCU), the address of the device 13 being addressed (this address is saved in a work register of microprocessor 110) and the command code (MP=CXX) indicating what is to be performed by storage subsystem 10. After the above described housekeeping operations have been completed, microprocessor 110 at 391 senses the contents of CST 131 (FIG. 7) to determine whether or not the addressed device 13 has any identified errors or unusual conditions, such as indicated in PE section 243, and whether the A bit 211 of BST 137 is active such that some activity for the addressed device 13 can occur. If the above listed criteria are met, then at 392 microprocessor 110 examine CMD 233 of FIG. 7 to determine whether or not the command is a READ or WRITE command. If not a READ or WRITE command, then at 393 and 394 auxiliary functions, not pertinent to an understanding of the present invention, are performed; these functions include receiving command data (CMDATA) from a channel adapter 80, such as parameters modifying a logical control command, and the like, Numeral 394 indicates that the character of the command and the like have to be analyzed. Upon completion of such ancillary operations or when the command detected at 392 is a READ or a WRITE command, microprocessor 110 at 395 determines from CST 131 which control unit 11 is to execute the command stored in CMD 233. If the control unit is the other control unit, such as CU-1, then a message concerning the command is transferred to CU-1 via cable 109. Such message is transferred at 396 which includes the command data and the command itself. At 397, additional housekeeping functions are performed not pertinent to an understanding of the present invention. If the command is to be executed by the local control unit, i.e., CU-0, then no action need be taken. Additional nonpertinent logic steps are performed at 398. Finally at 400, microprocessor 110 reads BST 137 to determine the mode of operation of the buffer 15 segment allocated to the addressed device 13, i.e., is it in a read or write mode.

All of the remaining steps shown in FIG. 10 relate to detection of a delay in command execution. For example, at 401, microprocessor 110 determines whether or not a buffer 15 segment allocated to the addressed device 13 is full. BST 137 in a section represented by ellipsis 226 indicates whether the buffer 15 segment, represented by the entry of BST 137 corresponding to the DADDR 215 is full or empty. If the identified buffer 15 segment is not full, then there is no delay in a write mode. If the identified buffer 15 segment is full in the write mode, then at 402 microprocessor 110 sets channel command retry and reports this delay to channel adapter 80 for relaying to host 12. From steps 401 and 402 the CCR check exit routine having steps 416–418 is entered through point 403, as later described.

If, at logic step 400, BST 137 indicates the addressed device 13 is in the read mode, microprocessor 110 follows logic path 406 to check whether or not the buffer 15 segment allocated to the addressed device 13 is empty. This check is achieved in the four steps 407–411. First at 407, microprocessor 110 determines whether or not the addressed logical device is in the forward or backward mode as indicated by direction section D 222 of BST 137 and examines the buffer segment full or empty section (not shown) indicated by ellipsis 226. If the logical device is in the read forward mode and the buffer 15 segment is empty, then a delay is indicated by microprocessor 110 at 408 by setting CCR to unity and reporting a channel command retry to host 12 via a channel adapter 80. In a similar manner at 410, microprocessor 110 examines BST 137 entry associated with the addressed device 13 to determine whether or not the addressed device is in the read backward mode (section D 222) and empty (268). If the buffer 15 segment is empty, then at 411 a channel command retry is initiated. Returning momentarily to 391, if the addressed device does not have an allocated buffer 15 segment as indicated by BST 137 section A 210, then microprocessor 110 follows path 413 to set channel command retry at 414. Microprocessor 110 has now checked all possible conditions in the decoding of commands and receipt of messages from the other control unit 11 which may relate to a command that would cause a buffer causing delay indicated by a channel command retry.

The CCR checking routine having steps 416–418 is entered through point 403. At 416, microprocessor 110 checks whether or not a channel command retry has been instituted by any of the previously described operations. If not, then some "housekeeping" steps are performed at 417, which steps are not pertinent to an understanding of the present invention. If a delay is instituted, then CCRK 285 in LDT 133 for the addressed device must be incremented. This action is achieved by activating logic module BM IDF (not shown) at step 337, the last step at 418 activates logic module CS SCE 330, shown in FIG. 11. Each time microcode logic module CS DCD 323 is activated, CS SCE 330 is also activated.

Figure 11:
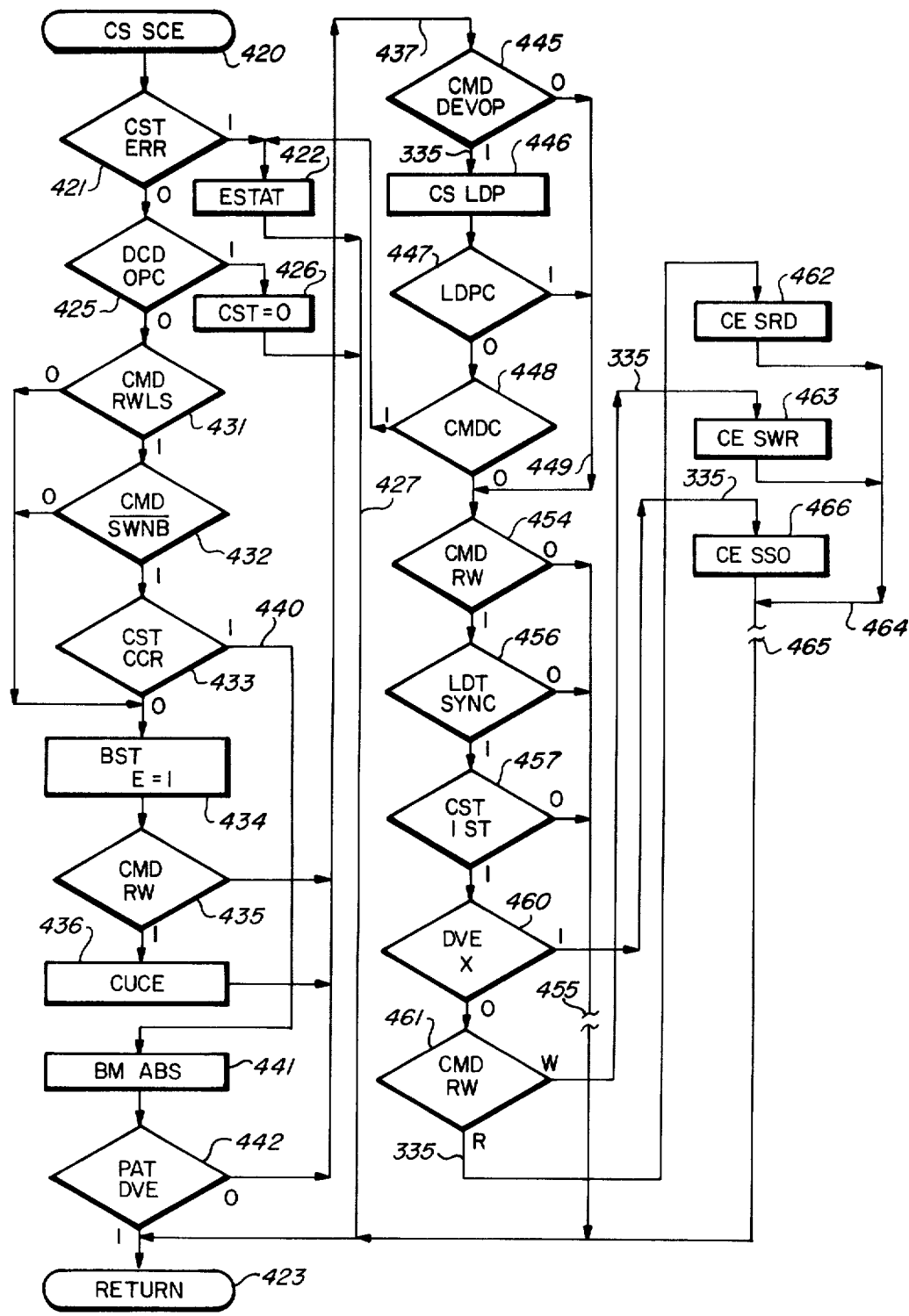
FIG. 11 is a logic diagram illustrating a logic module operated in connection with the FIG. 10 illustrated logic module used in connection with starting command execution following decoding.

FIG. 11 illustrates logic module CS SCE 330. This module ensures that a buffer 15 segment for the addressed device has been allocated for each command received for a required device function. If the command is a buffer using command, it also initiates buffer and device (logical device) preparation for the command, as appropriate. It also calls the proper command execution logic module of CUCE 152 to execute the command, as will become apparent. This logic module also enables microprocessor 110 to present ending status to the channel 16 via a channel adapter 80 and adjust the command status table 131 as appropriate; hence this logic module is the initiator and the finisher for each functional command execution. Logic module CS SCE 330 is only entered after microprocessor 110 has executed logic module CS DCD 323 or later described CS LDC 348. The logic module begins at 420 whereupon at 421 microprocessor 110 first checks for an error condition in CST 131 such as indicated by PE section 243. If an error is indicated, then ending status (ESTAT) is reported to the CNL 16 via a channel adapter 80 at 422. Then microprocessor 110 returns to an activating logic module at 423. Generally an error condition has not occurred, so microprocessor 110 at 425 determines whether or not the operation has been completed (OPC=1) as indicated by logic module CS DCD 323. When the operation has been completed as indicated by logic module CS DCD 323, the register 230 (FIG. 7) containing the information for the current command in CST 131 is erased at 426. The microprocessor 110 follows path 427 to report ending status at 422 and return to the calling module at 423. When the operation is not complete (OPC=0), microprocessor 110 at 431 and 432 analyzes the command. At 431 microprocessor 110 determines whether or not the received command is a READ (either forward or backward direction), WRITE, LOCATE BLOCK, READ DATA BUFFER, SENSE or a SYNCHRONIZE command. If the command is any one of the above, then at 432, microprocessor 110 determines that the command is not one of the following commands: REWIND, READ DATA BUFFER, a SPACE BLOCK command. The effect of analysis of steps 431 and 432 identifies those that will have to use buffer 15. For these commands microprocessor 110 will verify whether or not a buffer 15 segment has been allocated. But first, at 433 microprocessor 110 checks CST 131 section 238 to determine whether or not a CCR has been sent to a host 12 for this specific command as such as would be required by buffer conditions. If the received command identified in steps 431 and 432 is not CCR'd or the command is other than those identified in the logic of 431 and 432; then at 434 microprocessor 110 examines the BST 137 E section 211 and sets the E field to unity to indicate that the buffer 15 segment for the addressed device is engaged, i.e., the command is about to be executed and therefore the buffer 15 segment is busy. Then, microprocessor 110 at 435 determines whether the command is either a READ or a WRITE. For a READ or WRITE command, microprocessor 110 at 436 activates a command execution logic module within group CUCE 152 as indicated by line 335 of FIG. 14. The logic module activated is a function of the command identified in section 233 of CST 131. From steps 435 and 436 microprocessor 110 follows line 437 to execute a series of steps, as will be later described.

Returning to 433, if CST 131 has indicated a CCR had been given for the instant command, microprocessor 110 follows line 440 to allocate a buffer 15 segment by activating logic module BM ABS (not shown) at 441. Microprocessor 110 in following logic module BM ABS will attempt to allocate a buffer 15 segment to the addressed logical device for performing the instant command. Following a return from that logic module, microprocessor 110 at 442 determines from PAT 134 whether or not a buffer 15 segment has been scheduled for allocation to the addressed device. This information can also be provided by a so-called "return code" stored in a predetermined work register (not shown) of microprocessor 110 developed by BM ABS (not shown) which indicates that PAT 134 has received a request for allocation for the addressed device. If all of this activity is successful, microprocessor 110 returns at 423 awaiting the actual allocation and other activities that must occur before the command execution can proceed. On the other hand, if there was an allocation already in hand, then the command execution can proceed. Therefore, microprocessor 110 from 442 proceeds along line 437 to execute the above-referred-to steps, as will now be described.

At 445 microprocessor 110 determines whether or not a device 13 operation will be required to execute the instant command. If this is the case, a logical device must be prepared via line 335 (corresponding to line 335 of FIG. 1) to activate logic module CS LDP 347 as briefly described with respect to FIG. 1 and as detailed in FIG. 12. Following microprocessor 110 executing CS LDP 347, microprocessor 110 at 447 checks whether or not the logical device preparation has been completed (LDPC). If preparation was not completed, microprocessor 110 at 448 checks to see whether or not the command execution is complete (CMDC). If CMDC=1, ending status is reported at 422, as previously described. On the other hand, at 447 if preparation of the logical device is complete (LDPC=1) or at 448 the command execution is incomplete (CMDC=0) or at 445 it is not a device operation (DEVOP=0), microprocessor 110 proceeds over line 449 to 454 to see if the command is a READ or a WRITE command. If it is not either of those two commands, then some nonpertinent logic functions are performed at 455 and microprocessor 110 will then return to the activating logic module at 423. If the received command is a READ or WRITE command, microprocessor 110 at 456 checks to see whether or not the tape synchronous mode (read or write) of operation is indicated in LDT 133 section 290. If the mode is not the tape synchronous mode, then nonpertinent logic steps 455 are executed; otherwise microprocessor 110 proceeds to 457 to examine CST 131 for a first pass indication of execution of the received command by examining section 237. If it is not the first pass, then nonpertinent logic steps 455 are performed; otherwise microprocessor 110 follows path 458 to logic step 460 to determine if the addressed device has been held for the instant command (DVE X). If the addressed device has been held (DVE X=1) then, remembering that the tape synchronous mode was indicated at 456, a tape synchronous operation can ensue, as will be later described. However, if the addressed device is not being held for the instant command (DVE X=0), then the tape synchronous operation mode must be set up between the control unit 11 and the addressed device 13. To do this, microprocessor 110 at 461 determines whether the command is a READ or a WRITE. If it is a READ command, then at 462 microprocessor 110 goes to logic module CE SRD (not shown) for setting up the tape synchronous mode (read) within subsystem 10 for the addressed device. In the write mode, microprocessor 110 proceeds from 461 via 335 to logic module CE SWR (not shown) at 463. After executing either one of these logic modules, microprocessor 110 follows path 464 to perform some nonpertinent logic functions at 465 and then goes to return 423.

On the other hand, if the addressed device has been held (DVE X=1) then steps 462 and 463 will have already been completed. The tape synchronous mode then can be initiated for executing the received instant command. Accordingly, microprocessor 110 from 460 then proceeds via 335 to 466 which activates logic module CE SSO (not shown) which actually initiates transfer of data signals between a device 13 and a control unit 11 set up by either of logic modules CE SRD or CE SWR.

At this point in the processing of a received command, microprocessor 110 of control unit 11 has decoded the command, determined the status of the subsystem and either is in the process of preparing the subsystem to actually execute the command or has initiated execution via one of the command execution modules.

Figure 12:
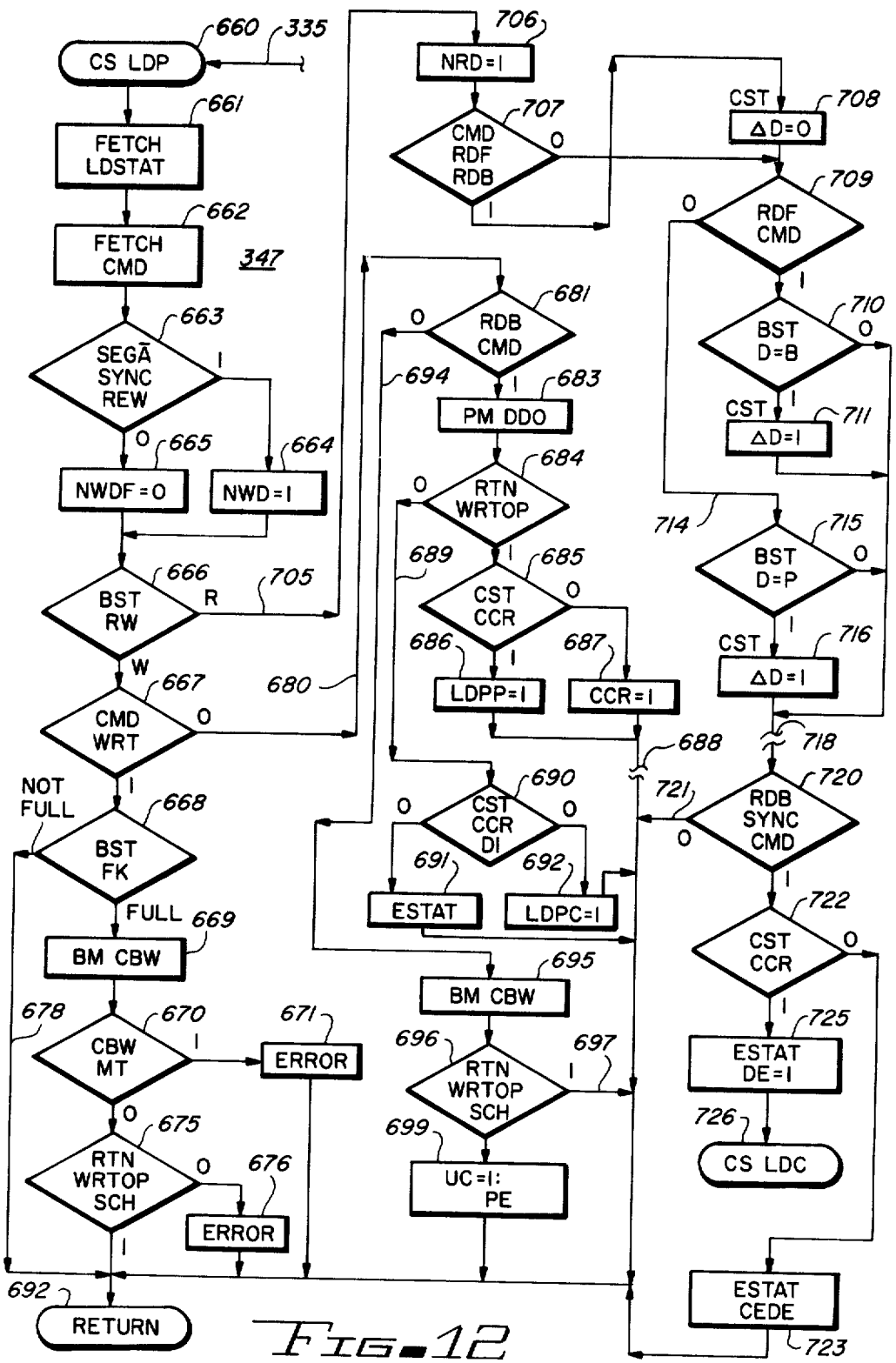
FIG. 12 is a logic diagram illustrating a logic module which enables the control of FIG. 3 to prepare a logical device for a data processing operation.

Once a CCR has been sent by storage subsystem 10 to a host 12, subsystem 10 signifies to host 12 by a DEVICE END signal that preparatory steps necessary for executing the CCR'd command have been met. Then the host 12 will reissue the input/output command to the storage subsystem. Accordingly, when a command has been received by the storage subsystem 10 and is being analyzed by CS DCD 323 and CS SCE 330 in preparation for execution or a READ, READ BACKWARD, or WRITE command and was previously CCR'd due to improper buffer 15 conditions (empty or full); then microprocessor 110 executes logic module CS LDP 347 and CS LDC 348 to prepare the logical device for the operations. FIG. 12 details logic module CS LDP 347 which fetches present buffer condition status from status store 100 and can initiate a write to device 13 operation to make some buffer 15 space in allocated segment available for the newly received WRITE command. For a READ BUFFER command to ensure that all writing operations to the device have been completed before the command is executed, all data to be written on a device 13 is first written to tape 54. When a newly received command is not a WRITE or READ BUFFER command, microprocessor 110 performs other operations, as will become apparent from the description of FIG. 12. Logic module CS LDP 347 is activated as indicated in FIG. 1 via line 335.

In FIG. 12 activation occurs at 660, then microprocessor 110 at 661 fetches the logical device (LD) status from status store 100. This includes a so-called device status byte which includes indications of whether or not the addressed device 13 is repositioning, rewinding, at end of tape, at beginning of tape, unit check conditions, device end conditions, file protect and other operational details. All of these signals are stored in work registers (not shown) of microprocessor 110 for execution of this logic module. Further, at 662 microprocessor 110 accesses CST 131 to transfer the received command code in section 233 to a work register (not shown) of microprocessor 110. Now microprocessor 110 has all of the necessary data plus the data in the tables of control store 111 to execute this logic module.

At 663 microprocessor 110 examines whether or not a buffer 15 segment is allocated to the addressed logical device and whether the command is a SYNCHRONIZE, READ DATA BUFFER, REWIND, or a REWIND UNLOAD command. If the above multitude of conditions are met, then a so-called no write data flag (NWDF) is set at 664. If the conditions are not met then the NWDF flag is reset at 665. This flag is in a work register (not shown) of microprocessor 110. Then at 666, if a buffer 15 segment is allocated to the addressed logical device represented by the addressed device 13, then that allocated buffer 15 segment can be in the write mode resulting in the fact there may be write data residual in that allocated buffer 15 segment. Then at 667 if the command code fetched at 662 is a WRITE command, microprocessor 110 at 668 determines whether or not the buffer is full. This determination is achieved by accessing BST 137 and examining section FK 224 to determine the count of free bytes in the allocated buffer 15 segment. If the free bytes are less than the block size of LDT 133 section 292, then the buffer is full. Following that determination, microprocessor 110 at 669 activates logic module BM CBW for recording the data resident in the allocated buffer 15 segment onto the addressed device 13 such that the WRITE command can be executed. Logic module BM CBW 349 then schedules a write operation to the addressed device 13. Returning from logic module BM CBW (not shown) microprocessor 110 at 670 looks at the return code to see if the execution of BM CBW resulted in an indication that the allocated buffer 15 segment was empty (MT=1). If the return code indicated segment is empty, then an error condition has occurred. The error data is assembled at 671 and the microprocessor 110 returns to the activating logic module at 672. Generally the write operation will have been scheduled by microprocessor 110 through logic module BM CBW 349. Then from 670, microprocessor 110 proceeds to 675 to see if a write operation actually had been scheduled. If not, an error has occurred and that error data is assembled at 676 with return via 672. Without an error, microprocessor returns directly to the activating logic module. On the other hand at 668 if BST 137 indicated that the allocated buffer 15 segment was not full, then microprocessor 110 follows path 678 directly to return 672.

Returning to 667, when the command fetched at 662 is not a WRITE command, microprocessor 110 follows path 680 to determine at 681 whether or not the command is a READ DATA BUFFER command (RDB). If it is a READ DATA BUFFER command, this means that host 12 wants to retrieve the data originally intended to be recorded on a device 13 and a write operation should not continue. Accordingly, at 683 microprocessor 110 activates logic module DM DDO (not shown) which enables microprocessor 110 to delete scheduled device operations from any of the three queues in DOT 136. If the addressed device is currently in a data transfer mode, the transfer is stopped. Logic module DM DDO enables microprocessor 110 to provide four return codes. The first code indicates that no device operation was scheduled in DOT 136 or was actually in progress for the addressed device 13. A second return code indicates that the operation was deleted from the queues in DOT 136. A third code indicates that a data transfer operation was occurring and it was terminated. The last code indicates that the addressed device is selected. Following execution of logic module DM DDO, microprocessor 110 at 684 checks a return code for the third return code which indicates that a write operation (WRTOP=1) was terminated. If this is the case, then at 685 microprocessor 110 examines CST 131 CCR bit 238 to see if a CCR had been sent to host 12. If a CCR actually had been sent, then microprocessor 110 at 686 sets a microprocessor flag in a work register (not shown) indicating that logical device preparation is proceeding (LDPP) to unity. Otherwise a CCR is sent at 687 for the existing write operation to the addressed device 13. Following these steps, microprocessor 110 at 688 performs some nonpertinent functions and then returns to the activating module via point 672.

Returning to step 684, if the return code from DM DDO of step 683 is not the third return code, then microprocessor 110 follows path 689 to step 690. AT 690, CST 131 is examined at CCR bit 238 together with an indication, in a section represented by ellipsis 244, that the CCR was given because the command had been retried due to data being processed on the device interconnection. Such a set of affairs indicates that the device operation had been completed before logic module CS LDP 347 was executed. When these conditions are met, microprocessor at 691 sends ending status of DEVICE END to host 12 indicating that the reason for the CCR has been satisfied. Following 691, microprocessor 110 returns to the activating logic module via 672. If the CCR bit was not active at 690, then at 692 microprocessor sets an internal flag in a work register (not shown) that logical device preparation has been completed (LDPC=1) then microprocessor 110 returns to the activating module. Now returning to step 681, if the command is not a READ DATA BUFFER command, then microprocessor 110 follows path 694 to ensure that the data that may be in the allocated buffer 15 segment is written into the addressed device 13. This action is achieved at 695 by activating logic module BM CBW 349, as explained earlier with respect to step 669. Returning from logic module BM CBW, microprocessor 110 at 696 checks the return code (RTN) to determine whether or not a write operation had been scheduled. If a write operation had been scheduled to the addressed device 13, microprocessor 110 follows path 697 to return 672. If a write operation had not been scheduled at 696, then at 699 microprocessor 110 indicates an error by setting up a UNIT CHECK (UC=1) indicating a permanent error (PE) and the return to the activating logic module via 672.

All of the above occurs when the allocated buffer 15 segment is in the write mode. When the allocated buffer 15 segment is indicated as being in the read mode at step 666, microprocessor 110 follows path 705 to set a non-read command flag at 706. This means the received command may or may not be a READ command. Then at 707 the command fetched at 662 is examined to determine if the received command is a READ FORWARD or READ BACKWARD command. If the received command is a READ type of command, then at 708 the direction change flag of CST 131 in the one of the sections represented by ellipsis 244 is reset. If the received command is not a READ command, then step 708 is omitted. At 709 microprocessor 110 determines if the received command is for read forward (RDF) which is a read in the forward direction of tape motion. Then at 710 microprocessor 110 examines BST 137 D bit 222 to see if the direction indicated is in a forward or backward direction. If the indicated direction is in the backward direction, then at 711 the change direction bit (not shown) of CST 131 is set to unity. On the other hand if a READ forward command was not sensed at 709, then the received command must be a READ command; microprocessor 110 follows path 714 to examine the BST 127 direction field at 715. If D bit 222 indicates a forward direction of tape motion then at 716 the change of direction bit of BST 137 is set to unity, otherwise step 716 is omitted.

Following the direction change determination, microprocessor 110 at 718 performs some nonpertinent functions. Then, at 720 microprocessor 110 determines at 662 whether the received command is a READ DATA BUFFER or a SYNCHRONIZE command. If the command is neither, then microprocessor follows 721 to return at 672. If it is either of the latter two commands, microprocessor 110 at 722 examines CST 131 CCR bit 238. If the bit is off, then the command has been completed and ending status of CHANNEL END and DEVICE END (CEDE) is established at 723, then the activating logic module is returned to at 672. Otherwise, at 725 the conditions for the CCR have been satisified by storage subsystem 10 and ending status is reported (DE=1). From 725 microprocessor 110 proceeds to logic module CS LDC 348 via exit point 726.

Figure 13:
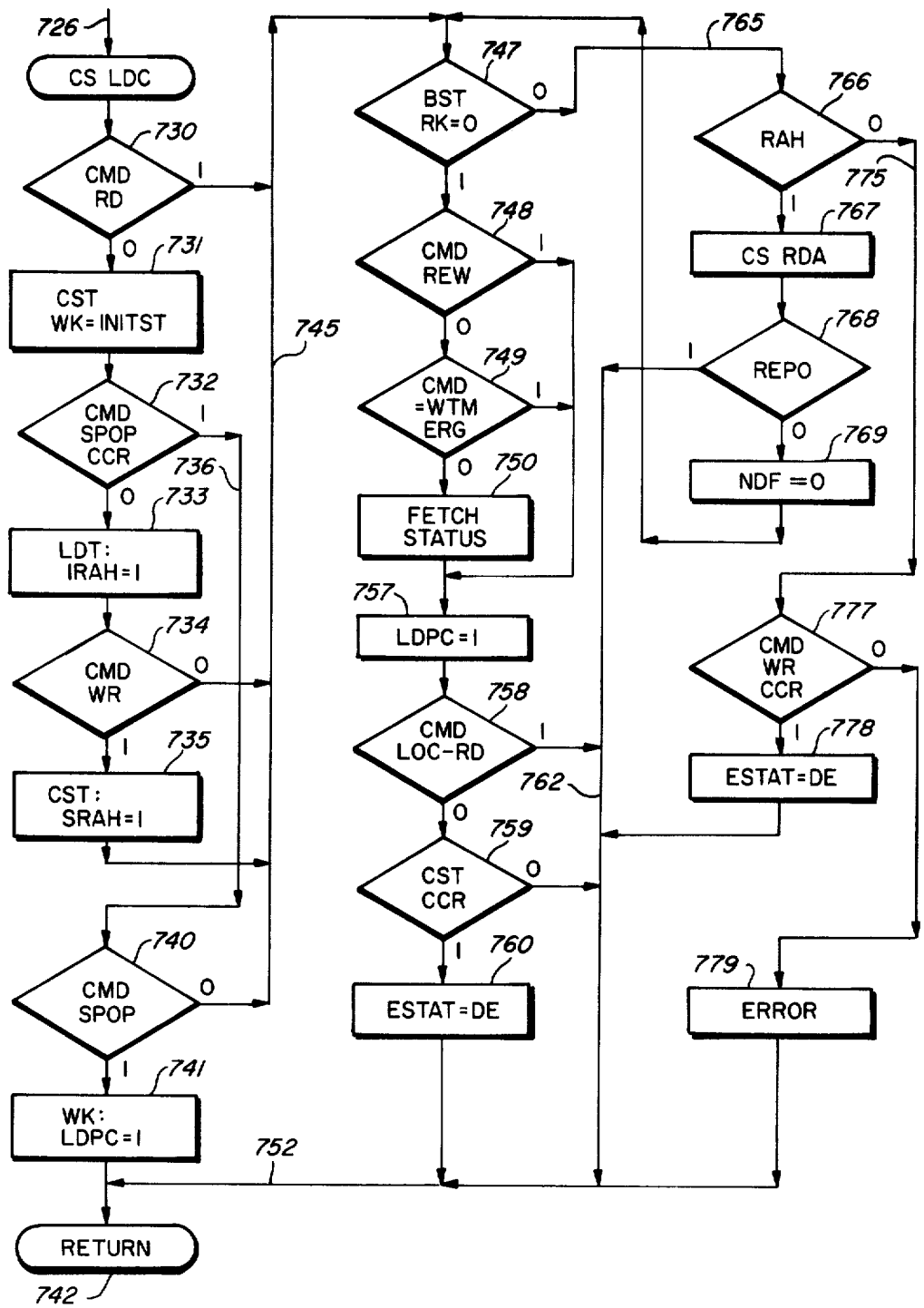
FIG. 13 illustrates a logic module which is a continuation of the FIG. 12 illustration.

FIG. 13 illustrates logic module CS LDC 348. If the received command fetched at 662 (FIG. 12) was not a READ command, then from 730 microprocessor at 731 accesses CST 131 to place the status store 100 reported initial status into work registers (not shown) of microprocessor 110. Initial status is also that status initially supplied to CNL 16 for each received command by a channel adapter 80. At 732, the received command fetched at 662 is analyzed for a space operation (SPOP); if the received command was not a space operation or was CCR'd by a channel adapter 80; then the inhibit read ahead bit IRAH 286 of LDT 133 is set to the active condition. At 734, if the command fetched at 662 is a WRITE command (WR=1), then at 735 SRAH bit 241 of CST 131 is set to the active condition. This suppresses all read ahead.

Returning to step 732, if the operation was a space operation or was not CCR'd by a channel adapter 80, then microprocessor 110 follows path 736 to step 740 to examine the received command to determine if it is a space operation type command. For a space operation type command, at 741 LDPC is set to the active condition. LDPC is previously described with respect to step 692 of FIG. 12. Then microprocessor 110 returns to the logic module that activated CS LDP 347.

If the received command was not a space operation type command, then microprocessor follows path 745 which also can be followed from step 735, step 734 when the command is not a WRITE command or from step 730 when the command is a READ command. From path 745, microprocessor 110 executes step 747 by fetching the contents of RK section 223 of BST 137 for the addressed device 13 and testing it for zero. When RK is zero there are no records in the buffer 15 allocated segment. Accordingly, at 748 microprocessor 110 examines the command fetched at 662 to determine if it is a REWIND command. If the command is not REWIND OR A REWIND UNLOAD; then at 749, if the command is not a WRITE TAPE MARK (WTM) or an ERASE GAP command with the allocated buffer 15 segment in the read mode, then at 750 the present status of the allocated buffer 15 segment is fetched from status store 100. In this regard, status store 100 maintains the operational state of both control units 11. The fetched status includes whether or not the buffer 15 segment has been deallocated with respect to the addressed device. Status will also include direction of motion of tape 54. The status store 100 is accessed by microprocessor 110 executing logic module CS RSS (not shown). From steps 748, 749, or 750 path 755 is followed set to a work register (not shown) flag LDPC to unity at 757. Then at 758 if the command is not a LOCATE BLOCK (LOC) or a READ or a READ BACKWARD command, then at 759 CST 137 CCR bit 238 is examined. If a CCR is indicated, microprocessor 110 at 760 generates ending status of DEVICE END (DE=1). From steps 758, 759 or 760, microprocessor 110 follows path 762 to path 752 and return 742.

Returning to step 747, if the record count (RK) 223 of the BST 137 register 209 representing the allocated buffer 15 segment is not zero, i.e., there are records in the allocated buffer 15 segment; then microprocessor 110 follows path 765 to perform the following described steps. At 766, if the data in the allocated buffer 15 segment is read ahead data, then at 767 the logic module SCS RDA 350 (FIG. 14) is activated. This logic module is activated whenever read ahead data in the buffer is to be deleted. Deletion is achieved by erasing the BRT 141 entries from the BRT registers allocated to the records by erasing these BRT 141 registers. The addressability to the data in the buffer 15 allocated segment is destroyed thereby effectively erasing the data from the buffer. Then, at 768 microprocessor 110 determines at 768 whether or not the addressed device 13 is repositioning based upon the execution of module CS RDA 350 of step 767. If no repositioning is occurring, no data was in the allocated buffer 15 segment. Accordingly, a no data flag (NDF) is reset to zero at 769; NDF is in a work register (not shown) of microprocessor 110. Following 769, microprocessor 110 follows path 770 to re-execute step 747 until the logical device preparation can be completed. On the other hand, at 768, if repositioning is occurring, a return is made immediately to the original activating logic module. Returning momentarily to step 769, if there was no data in the buffer 15 allocated segment, there is an apparent inconsistency between steps 747 and 769. This inconsistency is then checked out by returning to step 747.

Figure 14:
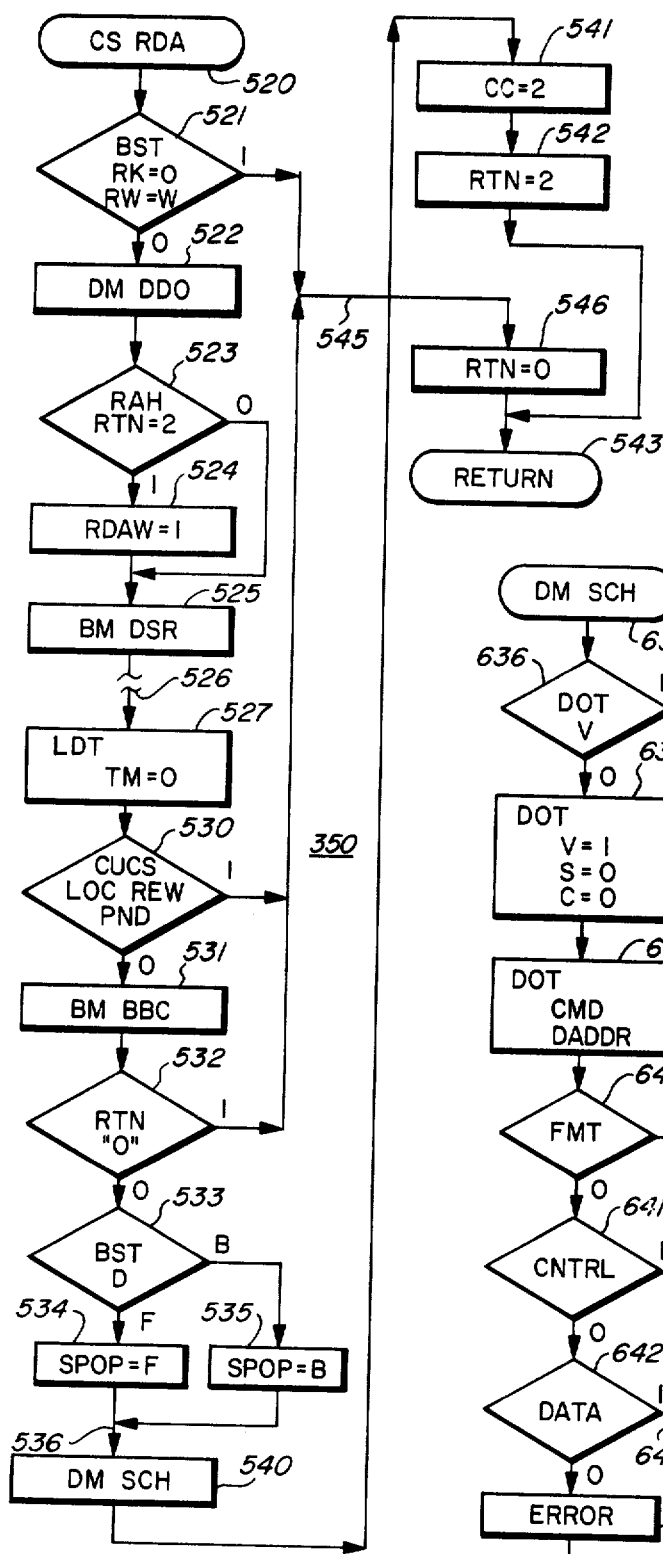
FIG. 14 is a logic diagram illustrating a logic module associated with erasing data in a buffer and initiating repositioning of a tape in accordance with the present invention.

FIG. 14 illustrates microcode logic module CS RDA 350. Entry at 520 by microprocessor 110 enables the microprocessor to delete the record entries BRT 141 for the addressed device 13, increment buffer log data (not shown) for the addressed device, and if a channel command is pending and the command is not a REWIND, REWIND UNLOAD or LOCATE BLOCK command or buffer deallocation is pending, microprocessor 110 determines how many data blocks were read ahead in buffer 15. Then microprocessor 110 schedules the device 13 to reposition tape 54 back to where it would have been if no read ahead operation had been performed. First, at 521, microprocessor 110 examines BST 137 RK section 223 to determine if it is zero and if the read-write bit 221 is in the write mode. If not, then read ahead data is in the buffer 15 segment allocated to the addressed device 13. At 522, logic module DM DDO (not shown) is activated. Microprocessor 110 in activating this logic module deletes the previously-scheduled device operation from DOT 136 irrespective of which queue the operation is in. Microprocessor 110 updates the chain field 269. If the addressed device 13 is in a data transfer, the transfer is stopped after the transfer of the current record being transferred is completed. These are well-known data processing operations. For this reason the logic module is not described in detail. Return codes provided from logic module DM DDO includes a return code of "0" for no operation being scheduled or in progress, a "1" for an operation deleted from DOT 136 queue in chain section 269, a "2" for a data transfer terminated and a "3" if the addressed device 13 was selected.

Next at 523, microprocessor 110 examines the return code from logic module DM DDO for a read ahead operation in progress. If a read ahead operation is in progress (RTN=2) then at 524 microprocessor 110 sets a flag labeled RDAW to unity within a work register (not shown). This flag indicates that a read ahead was in progress and the action of the present invention has to wait. If the return code is other than 2, then at 525 or after completing step 524, microprocessor 125 activates microcode logic module BM DSR (not shown) which deletes the segment record entry from BRT 141. Microprocessor 110 in executing logic module BM DSR accesses BRT 141 for the addressed device and puts all the BRT entries into a so-called free list (not shown) in work registers within microprocessor 110. The number of free bytes in BST 137 of section FK 224 is made equal to the size of the segment. A buffer empty flag (not shown) is set within status store 100 and byte-block counters in a so-called buffered log (not shown) are updated. Since the logic module BM DSR only includes accessing BRT 141 for deleting the entries, it is not described since accessing to a table by a microprocessor is well known. The free list in the work registers enable microprocessor 110 to synchronize the buffer 15 erasures with device 13 space operation. Then at 526 some nonpertinent logic functions are performed. Finally at 527 microprocessor 110 accesses LDT 133 to reset TM bit 289 to zero. At 530, microprocessor 110 determines from the command support logic module CUCS whether or not there is a LOCATE, REWIND, REWIND UNLOAD command pending. If not, at 531 microprocessor 110 activates logic module BM BBC (not shown). In this logic module, microprocessor 110 computes the difference between the block count for channel transfers and the block count for the addressed device; that is, in the illustrated subsystem each record or block on tape 54 is assigned a serial number for each tape. As a tape is read and data transferred to buffer 15, a number is generated and kept within LDT 133. This number indicates the block that was just transferred from tape 54. In a similar manner, as data transfers proceed from buffer 15 to host 12 another section of LDT 133 (not shown) keeps track of the block number being transferred. The difference between the two block numbers indicates the number of blocks in buffer 15 as well as the location on tape 54 of the earliest read block of data, i.e., the channel block number indicates the oldest block of data in buffer 15. Since this is a simple accessing of LDT 133 and subsequent subtraction operation, it is not detailed. The return codes are "0" when channel and device block numbers are equal (buffer empty), a "1" when the channel block identification is greater than the device block identification (results from a read in the forward direction) or a "2" when the channel block identification is less than the device block identification (a read in the backward direction). For a return code at 532 of "0", i.e., the position of tape 54 is appropriate, then an exit is taken as later described. If repositioning is required, then at 533 BST 137 is accessed for sensing the direction bit D 222 for reading in the forward direction. A forward space operation (SPOP) is set at 534. At 535 for a read in the backward direction D, a space operation SPOP is set in the backward direction. Then over path 536, microprocessor 110 activates logic module DM SCH 353 at 540, as described and shown in FIG. 15. At 541, a continuing command parameter is set for waiting for repositioning of tape 54 such that a DEVICE END can be sent to host 12 upon completion of the repositioning to signify that data processing operations for the addressed device 13 can ensue. At 542, a return code of 2 is set to signify repositioning is in progress. Exit is taken at 543.

If no repositioning of tape 54 is required, then microprocessor 110 follows path 545 to set a return code of "0" at 546, then takes an exit. Path 545 is entered from step 521 when either the RK section 223 of BST 137 is "0" or the addressed device is in the write mode. From step 530 if a REWIND or LOCATE command was being executed, then no data is in the buffer segment. Similarily for a return code of "0" at 532, i.e., the block numbers for the channel and the device were equal (buffer 15 segment is empty), then path 545 is also followed.

Figure 15:
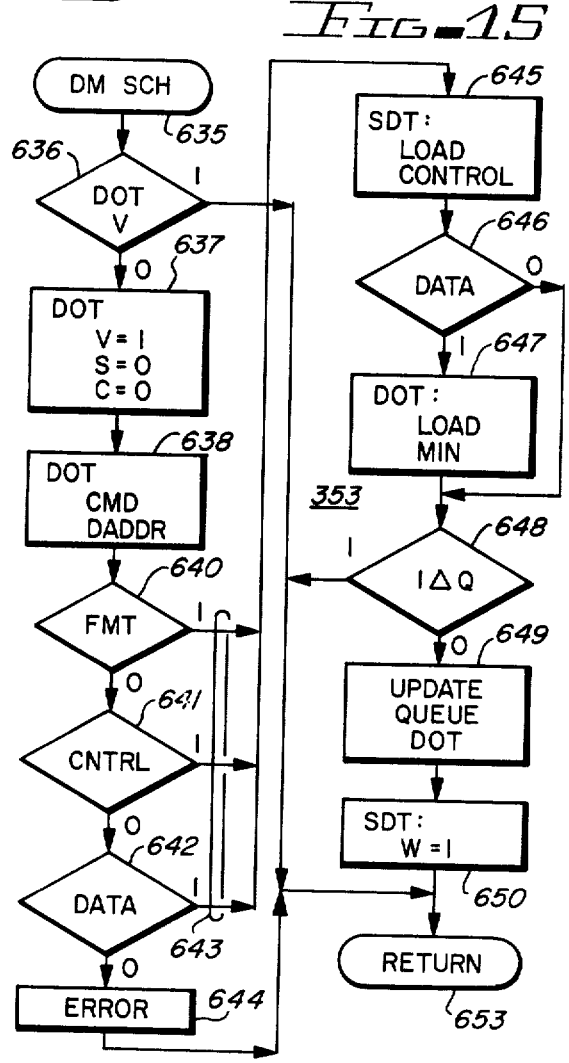
FIG. 15 is a logic diagram showing a device operation scheduling logic module used in connection with explaining the present invention.

FIG. 15 details logic module DM SCH 353. This logic module enables microprocessor 110 to schedule a device operation by inserting suitable signals into one of three queues in DOT 136. It is remembered that the priority classes for device operation are set forth in the three queues: CCQ, ICQ and XQ. Priority in the present embodiment are for the device information operation of ICU followed by the device control operation in CCQ and then data transfer operations in XQ. The three queues are established via the chain section 269 of the registers 270 in DOT 136. All of these functions are performed by microprocessor 110 when it enters DM SCH 353 at 635. The first step is to examine DOT 136 V bit 274 at 636 to determine whether or not a device operation has already been scheduled for the addressed device 13. If a device operation has already been scheduled then a return is made at 653. If no operation has been scheduled (V=0), then at 637 DOT 136 registers associated with the addressed device 13 as indicated in section 272 is altered by setting V bit 274 to 1, S bit 275 to 0 and C bit 276 to 0. S and C bits respectively represent a device operation having been started and completed.

At 638, the DOT 136 register 270 is updated with the new command in section 273 and a new DADDR, if necessary. At this point in time, which queue 21-23 is to receive the entry has not been determined. Accordingly steps 640, 641, 642 are executed respectively to select one of the queues ICQ, CCQ or XQ. ICQ 22 handles format type of operations for each device 13 as may be required for generating an interblock gap (IBG). If none of the functions are indicated then an error has occurred which is identified at 644 and reported to host 12 later after returning to the activating logic module at 653. On the other hand, one of the three queues 21-23 can be updated as indicated at 643. Then at 645, control information is loaded into SDT 132 (not shown). For example, for format control there will be pointers (addresses to control store) relating to pattern sequences establishing an interblock gap and the like in ICQ. For a control sequence, a similar pointer is loaded into its own pointer field (not shown) in SDT 132 for the first entry of Q. For a data transfer operation, as detected at 642, a pointer to XQ's first entry is loaded into SDT for pointing to a minimum number of records to be transferred (as was calculated via a logic module leading into DM SCH 353). Then, at 646 microprocessor 110 determines whether or not the device operation is a data operation as detected at 642. For a data transfer with a device 13, SDT 132 (not shown) has its section RK (record count, not shown) filled with MIN for indicating the number of records to process in the current device 13 selection. The situation is such that when the number of processed records PK set forth SDT 132 exceeds the number RK of records to transfer, the read operation proceeds only when a W bit (wait bit, not shown) is turned off. W=0 means there will be no waiting as host 12 is transferring records from buffer 15 and device 13 can continue its reading tape 54.

Next microprocessor 110 at 648 determines whether or not incrementing any of the respective queues ICQ, CCQ, XQ is inhibited. If queue incrementing is inhibited (such as for diagnostic purposes), then a return is made. If the queues ICQ, CCQ, XQ can be incremented, then at 649 a queue in DOT 136 is updated at 649. Then at 650, the W bit 309 of SDT 132 is set to unity. At this point in time a device 13 has been scheduled by inserting an appropriate entry into one of the three queues ICQ, CCQ or XQ. Microprocessor 110 scans those queues and then activates CUDM 158 and other groups of logic modules for actually activating device 13 to transfer data or perform other functions as identified in respective queues.

Figure 16:
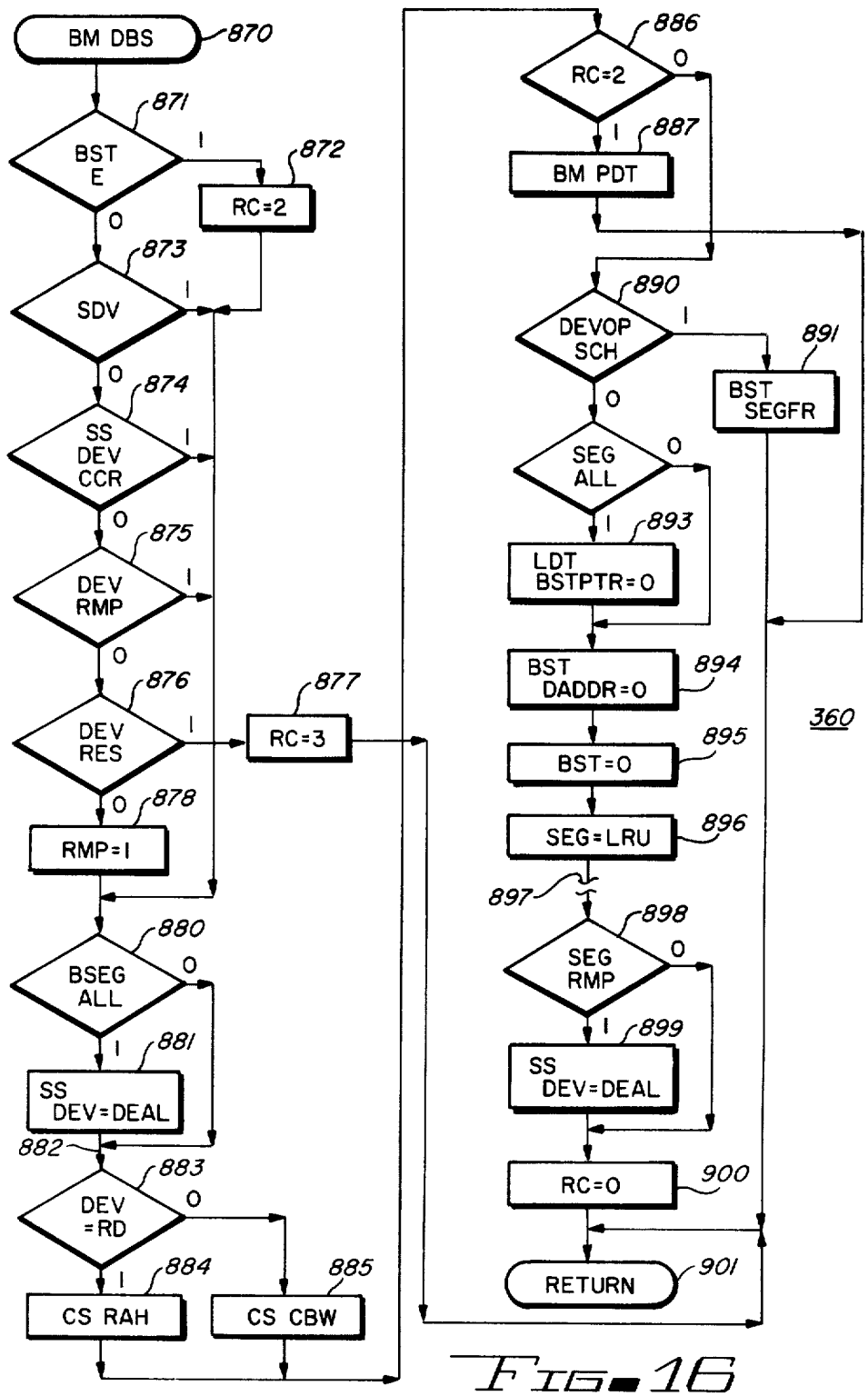
FIG. 16 is a logic diagram showing a logic module of the FIG. 3 illustrated control used in connection with deallocating a buffer segment in connection with erasing data from the allocated buffer segment.

Logic module BM DBS 360 shown in FIG. 16 is activated by any one of serveral logic modules shown in FIG. 1 by numeral 357 and indicated in FIG. 16 by numeral 870. First microprocessor 110 at 871 examines BST 137 to determine whether or not the logical device which is to have its buffer 15 segment deallocated is engaged, i.e., active with a data processing operation. This determination is achieved by examining field 264. If it is engaged, then at 872 the return code is set to a two as indicated by RC=2 for later use in determining actions to be taken, such as insertion of the device address into the pending deallocation table PDT 138. If the buffer 15 segment to be deallocated is not engaged at 871, then at 873 microprocessor 110 determines whether or not the deallocation is a result of sending the device to CU-1. Steps 873 through 876 determine whether or not the addressed device should be reserved to microprocessor 110. If the present activity is a send device to CU-1 operation, then at 873 microprocessor 110 should not have exclusive control over the addressed device 13. Similarily, at 874 status store 100 is examined to see whether or not a CCR was sent to host 12; if so, microprocessor 110 should not have exclusive control over the addressed device 13. Also at 875, microprocessor 110 determines whether or not the addressed device is currently reserved to microprocessor 110. If it is reserved to microprocessor 110, no further reserving action is required. At 876 microprocessor 110 determines whether or not the addressed device 13 is reserved to a channel adapter 80 for one of the hosts 12. If it is reserved to a channel adapter 80, then a return code RC is set to 3 at 877 indicating that before buffer deallocation can occur that the data signal contents of the buffer 15 segment have to be purged. If all of the steps 873 through 876 indicate negative (zero) responses, then at 878 microprocessor 110 reserves the logical device including device 13 and buffer 15 segment to the microprocessor 110 by setting RMP=1 (not shown) in a work register and informing status store 100 that the logical device bearing the device 13 address is under exclusive control of microprocessor 110. Reserving the logical device to microprocessor 110 prevents a host 12 from selecting that device until completion of the deallocation procedures within CU-0, i.e., reserves device 13 for a storage subsystem activity. At 880, microprocessor 110 senses status store 100 to determine if status store 100 has a signal indicating that the buffer 15 segment to be deallocated is currently indicated as being allocated. This memorization is not shown since marks in memory are well known; that is, status store 110 has a memory indicating the logical configuration of storage subsystem 10. If allocation of the buffer 15 segment to be deallocated is indicated as being allocated, then at 881 microprocessor 110 commands status store 100 to indicate that the buffer 15 segment is to be deallocated. From steps 880 and 881 microprocessor 110 follows line 882 to execute branch logic step 883. At 883 microprocessor 110 examines BST 137 field 246 to determine whether the device is in a read or write mode. At this point, it should be noted that there is data in the buffer 15 segment to be deallocated. Accordingly at 884 and 885, respectively, for the read and write modes, modules CS RDA (not shown) and CS CBW (not shown) are respectively activated for purging data in a read mode and recording data in addressed device 13 in a write mode. Following activation of these modules, at 886 microprocessor 110 checks the return code RC=2. If return code is 2, i.e., BST 137 has indicated in E field 264 that the device was engaged, logic module BM PDT (not shown) is activated at 887 to place the identification of the buffer 15 segment into pending deallocation table PDT 138. From step 887 a return is made at 901. If RC/2, then microprocessor 110 at 890 determines whether or not a device operation has been scheduled. Device operation scheduling is maintained in device operation table DOT 136. If a device 13 operation has been scheduled with respect to the buffer 15 segment being deallocated, then at 891 microprocessor 110 enters into BST 137 that the buffer 15 segment is to be freed by setting F field 265 to unity. On the other hand, if no device operation was scheduled, then microprocessor 110 at 892 checks to see if the buffer 15 segment to be deallocated is allocated as indicated at 880. If allocation is indicated, then microprocessor 110 at 893 accesses LDT 133 for zeroing the BSTP field 253 of LDT 133 which destroys the addressability of the corresponding entry of BST 137, i.e., effectively erases the contents of BST 137 relating to the buffer 15 segment thereby deallocating same. At 894, 895 and 896, the remaining steps are performed for completing the deallocation of an empty buffer 15 segment. The DADDR field of BST 137 is zeroed and at 895 the remaining fields of BST 137 pertaining to the buffer 15 segment and its logical device are all zeroed. At 896 the buffer 15 segment being deallocated is made the least recently used segment of buffer 15. Then at 897 non-pertinent logic steps are performed by microprocessor 110. At 898 microprocessors 110 determines whether or not the logical device, i.e., buffer 15 segment and device 13 are reserved to the microprocessor, if so, status store is accessed at 899 and the addressed device is indicated as being deallocated. These steps complete the deallocation function such that at 900 the return code RC is made equal to zero for later indicating to the microprocessor 110 that deallocation of the buffer segment has been successfully completed. Return 901 is then taken.

While the invention has been particularly shown and described with reference to preferred embodiments thereof, it will be understood by those skilled in the art that various changes in form and details may be made therein without departing from the spirit and scope of the invention:

What is claimed is:

1. The method of operating a magnetic tape recorder having a magnetic record tape transportable therein and a data buffer with means to transfer data from said magnetic tape recorder to said buffer;

the steps of:

transferring predetermined blocks of data retentively recorded on said magnetic tape from said magnetic tape recorder to said buffer in anticipation of future requirements for said data by a data unit coupled to said buffer such that said predetermined blocks of data can be then accessed by the data unit directly from said buffer without then accessing said magnetic tape recorder;

upon completion of each said transfer of each said predetermined block of data, tallying the number of blocks of data resident in said buffer;

then changing the mode of operation of said magnetic tape recorder to a mode other than said transferring blocks of data to said buffer from said magnetic tape recorder; and in response to said change, purging said predetermined blocks of data from said buffer and activating said tape recorder to reposition the magnetic tape so as to next sense the data recorded on the magnetic tape which is a copy of said predetermined blocks of data just purged from said buffer whereby the repositioned tape reflects the desired tape position without said predetermined blocks of data having been transferred to said buffer.

2. The method set forth in claim 1 including changing the direction of tape transport motion in said magnetic tape recorder and treating said motion direction change as said change in mode of operation whereby said data is purged from said buffer.

3. The method set forth in claim 1 including beginning to transport said magnetic tape in said magnetic tape recorder for a purpose other than to transfer said predetermined blocks of data from said recorder in anticipation of future tape motion requirements and treating such beginning of tape transport motion as said change in mode of operation whereby said predetermined blocks of data are purged from said buffer.

4. The method set forth in claim 3 wherein said beginning of transport is for recording data signals on said record tape.

5. The method of operating a peripheral system with a magnetic tape recorder having a magnetic record tape transportable therein and a data buffer and adapted to be connected to a host processor which will have future requirements for data stored in said magnetic record tape, the steps of:

sequentially transferring blocks of said stored data from said magnetic record tape in said magnetic tape recorder to said buffer for storing in said buffer a plurality of said blocks of data at a given time in anticipation of future requirements for said data such that the buffer stored data can be accessed directly from said buffer as a first mode of operation of said peripheral system, keeping a running tally of the number of blocks of data stored in said buffer for said future requirements.

indicating to the peripheral system that no future requirements now exist for accessing more data from said magnetic tape recorder, in response to said indication, removing said first mode of operation from said peripheral system for instituting a second mode of operation, and in response to removing said first mode of operation, purging the data from said buffer that was stored therein for said future requirements and activating said tape recorder to reposition said record tape to next sense the data recorded on the tape corresponding to the first block read into said buffer in said first mode of operation and that was just purged from said buffer whereby the actual position of the tape is reestablished to reflect a tape position for data that actually has been transferred to said host processor.

6. The method set forth in claim 5 further including the steps of receiving in said peripheral system from said host processor a command that requires said peripheral system to change direction of tape motion, space over one or more blocks of signals recorded on said tape without reading such blocks of signals or introduce a recording mode into said peripheral system for said recorder, and in response to said reception of one of said commands during said first mode of operation to remove said first mode of operation for establishing said second mode of operation.

7. A buffered tape-recording peripheral system adapted to be connected to a host processor and having a plurality of magnetic tape recorders connected to a buffer, control means for transferring data from the magnetic tape recorder to said buffer before said host requests said data from said peripheral system but in anticipation of a further request by said host for data recorded on tape in said tape recorders, the improvement comprising:

means for indicating a predetermined change in future peripheral system actions with respect to a given one of said tape recorders and wherein certain data from said given one tape recorder presently resides in said buffer, buffer control means connected to said buffer and to said indicating means responsive to said indication to purge said certain data from said buffer and having means indicating data stored in said buffer as a buffer status, and tape control means connected to said given tape recorder and to said indicating means for responding to said indication to actuate said given tape recorder to reposition said tape in said given tape recorder so as to next read data on said tape corresponding to said certain data purged from said buffer by said buffer control means and which had resided in the buffer the longest of any such purged certain data command means connected to said host processor for receiving peripheral commands from the host processor for effecting command execution by said peripheral system;

recorder preparation means connected to said tape recorders and to said command means for preparing said tape recorders for said command execution and including means connected to said buffer control means for comparing a received one of said command with said buffer status indicated by said buffer control means for determining whether or not data relating to said received predetermined one command is currently stored in said buffer as received from a one of said recorders, respectively; and said indicating means being connected to said comparing means for being responsive to said comparison which indicates no need for data in the buffer for executing said received predetermined one of said command for supplying said indicating of said predetermined change.

* * * * *